(12) United States Patent
Enbuske et al.

(10) Patent No.: US 12,127,271 B2
(45) Date of Patent: Oct. 22, 2024

(54) PUSCH RESOURCE SELECTION IN 2-STEP RANDOM ACCESS

(71) Applicant: Telefonaktiebolaget LM Ericsson (publ), Stockholm (SE)

(72) Inventors: Henrik Enbuske, Stockholm (SE); Jan Christoffersson, Luleå (SE); Zhipeng Lin, Nanjing Jiangsu (CN); Johan Rune, Lidingö (SE); Robert Mark Harrison, Grapevine, TX (US); Jonas Sedin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 410 days.

(21) Appl. No.: 17/629,950

(22) PCT Filed: Jul. 13, 2020

(86) PCT No.: PCT/SE2020/050730
§ 371 (c)(1),
(2) Date: Jan. 25, 2022

(87) PCT Pub. No.: WO2021/029803
PCT Pub. Date: Feb. 18, 2021

(65) Prior Publication Data
US 2022/0264659 A1    Aug. 18, 2022

Related U.S. Application Data

(60) Provisional application No. 62/886,754, filed on Aug. 14, 2019.

(51) Int. Cl.
*H04W 74/0833* (2024.01)
*H04B 17/318* (2015.01)
(Continued)

(52) U.S. Cl.
CPC ...... *H04W 74/0841* (2013.01); *H04B 17/318* (2015.01); *H04L 1/0003* (2013.01);
(Continued)

(58) Field of Classification Search
CPC ............... H04B 17/318; H04L 1/0003; H04W 74/0841; H04W 72/0446; H04W 72/0453;
(Continued)

(56) References Cited

U.S. PATENT DOCUMENTS

2021/0410182 A1* 12/2021 Zhang ................... H04L 5/0048

OTHER PUBLICATIONS

International Search Report and Written Opinion dated Sep. 15, 2020 for International Application No. PCT/SE2020/050730 filed Jul. 13, 2020, consisting of 9 pages.
(Continued)

*Primary Examiner* — Khoa Huynh
(74) *Attorney, Agent, or Firm* — Weisberg I.P. Law, P.A.

(57) ABSTRACT

Methods and apparatuses are disclosed for PUSCH resource selection in 2-step random access (RA). In one embodiment, a wireless device is configured to receive a two-step RA configuration having: a first resource allocation for a PUSCH transmission of a first message, msgA, of the two-step RA procedure, the first resource allocation for the PUSCH transmission of the msgA being associated with a first set of preambles; and a second resource allocation for the PUSCH transmission of the msgA associated with a second set of preambles; select one of the first and second resource allocation and the associated one of the first and second set of preambles based on the two-step RA configuration and a payload size of the PUSCH transmission of the msgA; and transmit the PUSCH transmission of the msgA using the selected one of the first and second resource allocation.

20 Claims, 13 Drawing Sheets

(51) Int. Cl.
  *H04L 1/00* (2006.01)
  *H04W 72/0446* (2023.01)
  *H04W 72/0453* (2023.01)
  *H04W 74/00* (2009.01)
  *H04W 74/08* (2009.01)
(52) U.S. Cl.
  CPC .................. *H04W 72/0446* (2013.01); *H04W 72/0453* (2013.01); *H04W 74/002* (2013.01); *H04W 74/0866* (2013.01)
(58) Field of Classification Search
  CPC ........... H04W 74/002; H04W 74/0866; H04W 74/0833
  See application file for complete search history.

(56) References Cited

OTHER PUBLICATIONS

3GPP TS 38.331 V15.6.0; 3rd Generation Partnership Project; Technical Specification Group Radio Access Network; NR; Radio Resource Control (RRC) protocol specification (Release 15); Jun. 2019; consisting of 519 pages.
3GPP TS 38.213 V15.6.0; 3rd Generation Partnership Project; Technical Specification Group Radio Access Network; NR; Physical layer procedures for control (Release 15); Jun. 2019; consisting of 107 pages.
3GPP TS 38.321 V15.6.0; 3rd Generation Partnership Project; Technical Specification Group Radio Access Network; NR; Medium Access Control (MAC) protocol specification (Release 15); Jun. 2019; consisting of 78 pages.
3GPP TS 38.211 V15.6.0; 3rd Generation Partnership Project; Technical Specification Group Radio Access Network; NR; Physical channels and modulation (Release 15); Jun. 2019; consisting of 97 pages.
3GPP TS 38.214 V15.6.0; 3rd Generation Partnership Project; Technical Specification Group Radio Access Network; NR; Physical layer procedures for data (Release 15); Jun. 2019; consisting of 105 pages.
3GPP TSG RAN WG1 #96 R1-1902466; Title: Channel structure for two-step RACH; Source: Intel Corporation; Agenda item: 7.2.1.1; Document for: Discussion and Decision; Date and Location: Feb. 25-Mar. 1, 2019, Athens, Greece; consisting of 8 pages.
3GPP TSG-RAN WG1 Meeting #96Bis R1-1904993; Title: Procedures for Two-Step RACH; Agenda item: 7.2.1.2; Source: Qualcomm Incorporated; Document for: Discussion and Decision; Date and Location: Apr. 8-12, 2019, Xi'an, China; consisting of 12 pages.
3GPP TSG-RAN WG2 Meeting #106 R2-1905601; Title: RACH initialization and resource selection for 2-step RACH; Agenda Item: 11.13.5; Source: OPPO; Document for: Discussion, Decision; Date and Location: May 13-17, 2019, Reno, USA; consisting of 4 pages.

* cited by examiner

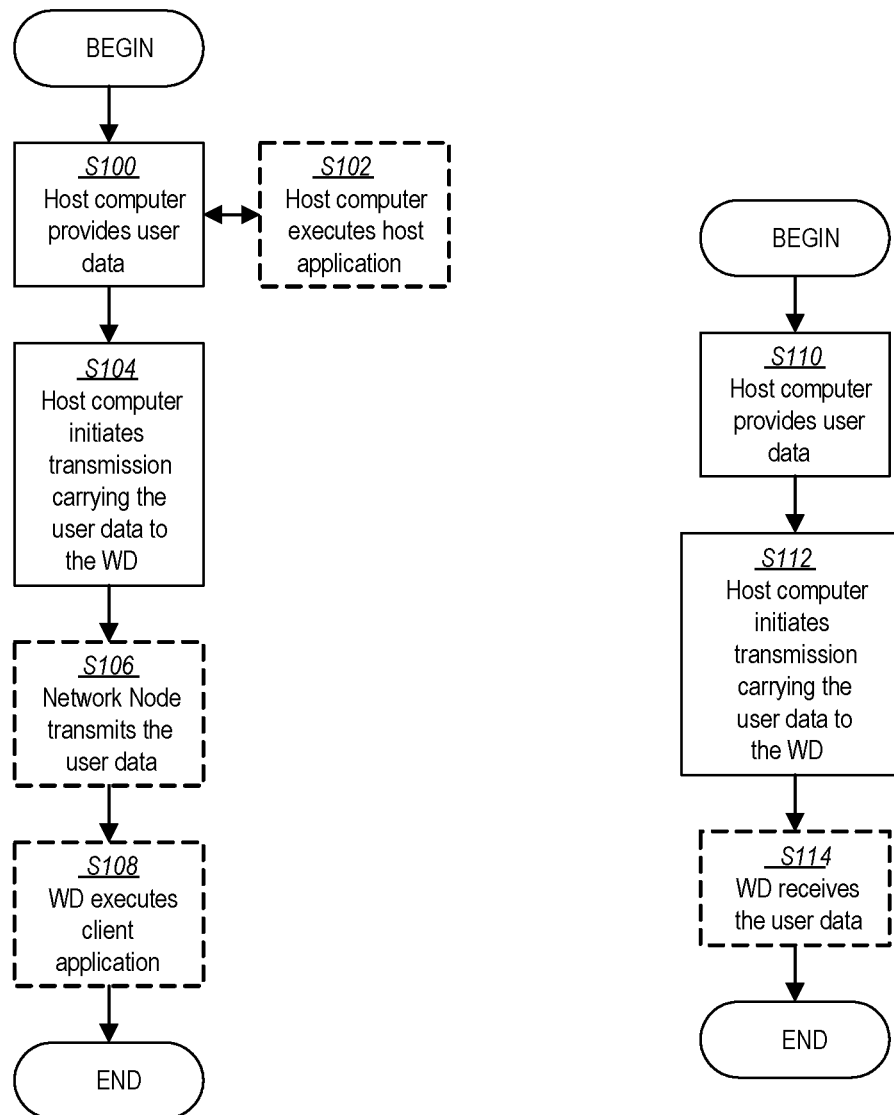

PUSCH RESOURCE SELECTION IN 2-STEP RANDOM ACCESS

CROSS-REFERENCE TO RELATED APPLICATIONS

This application is a Submission Under 35 U.S.C. § 371 for U.S. National Stage Patent Application of International Application No.: PCT/SE2020/050730, filed Jul. 13, 2020 entitled "PUSCH RESOURCE SELECTION IN 2-STEP RANDOM ACCESS," which claims priority to U.S. Provisional Application No. 62/886,754, filed Aug. 14, 2019, entitled "PUSCH RESOURCE SELECTION IN 2-STEP RANDOM ACCESS," the entireties of both of which are incorporated herein by reference.

TECHNICAL FIELD

The present disclosure relates to wireless communications, and in particular, to physical uplink shared channel (PUSCH) resource selection in 2-step random access (RA).

BACKGROUND

RACH Configurations in NR

In the $3^{rd}$ Generation Partnership Project (3GPP) New Radio (NR) (also known as "5G") standards, the random access (RA) procedure is described in the NR medium access control (MAC) specifications and parameters as configured by radio resource control (RRC), e.g., in system information or handover (RRCReconfiguration with reconfigurationWithSync). Random access is triggered in many different scenarios, for example, when the WD is in RRC_IDLE or RRC_INACTIVE and attempts to access a cell that it is camping on (i.e., transition to RRC_CONNECTED).

In NR, random access channel (RACH) configuration is broadcasted in system information block 1 (SIB1), as part of the servingCellConfigCommon information element (IE) (with both downlink (DL) and uplink (UL) configurations), where the RACH configuration is within the uplinkConfigCommon IE. The exact RACH parameters are within what is called initialUplinkBWP, since this is the part of the UL frequency the WD accesses and searches for RACH resources.

The RACH configuration parameters may be found in the 3rd Generation Partnership Project (3GPP) Technical Specification (TS) 38.331, version 15.6.0, focusing primarily on parameters related to the mapping of preamble and RACH resources/occasions, which, in future versions of the specification, potentially also may be mapped to PUSCH resources for MsgA transmission in a 2-step random-access.

The following sections describes the 4-step RA and 2-step RA in NR Release 15 (Rel-15) and Release 16 (Rel-16), respectively, where in 2-step RA a combined preamble and msgA physical uplink shared channel (PUSCH) is followed by a msgB physical downlink shared channel (PDSCH) transmission as initially agreed to be applied in 2-step RA.

4 Step RA Procedure in NR

A 4-step approach is used for the NR Rel-15 random access procedure, as shown, for example, in FIG. 1. In this approach, the WD detects a synchronization signal (SS) and decodes the broadcasted system information, followed by the WD transmitting a physical random access channel (PRACH) preamble (message 1/msg 1) in the uplink. The network node (e.g., gNB) replies with a RAR (Random Access Response, message 2/msg 2). The WD then transmits a WD identification (message 3/msg 3) on PUSCH.

The WD transmits PUSCH (message 3) after receiving a timing advance (TA) command in the RAR, allowing PUSCH to be received with a timing accuracy within the cyclic prefix (CP). Without this timing advance, a very large CP would be needed in order to be able to demodulate and detect PUSCH, unless the system is applied in a cell with very small distance between WD and network node (e.g., eNB). Since NR will also support larger cells with a need for providing a timing advance to the WD, this 4-step approach is used for a random access procedure.

NR Rel-15 PRACH Configuration

In NR, the time and frequency resource on which a physical random access channel (PRACH) preamble is transmitted is defined as a PRACH occasion.

In this disclosure, the PRACH occasion is also called RACH occasion, or RA occasion, or in short RO. And the RO used for the transmission of the preambles in 2-step RA is called 2-step RO, while the RO used for the transmission of the preambles in 4-step RA is called 4-step RO.

The time resources and preamble format for PRACH transmission are configured by a PRACH configuration index, which indicates a row in a PRACH configuration table specified in 3GPP TS 38.211 version 15.6.0 Tables 6.3.3.2-2, 6.3.3.2-3, 6.3.3.2-4 for frequency 1 (FR1) paired spectrum, FR1 unpaired spectrum and frequency 2 (FR2) with unpaired spectrum, respectively.

Part of Table 6.3.3.2-3 in 3GPP TS 38.211, version 15.6.0 for FR1 unpaired spectrum for PRACH preamble format 0, includes the value of x in Table 6.3.3.2-3 indicating the PRACH configuration period in number of system frames. The value of y in Table 6.3.3.2-3 indicates the system frame within each PRACH configuration period on which the PRACH occasions are configured. For instance, if y is set to 0, then, it means PRACH occasions only configured in the first frame of each PRACH configuration period. The values in the column "subframe number" of Table 6.3.3.2-3 tells on which subframes are configured with PRACH occasion. The values in the column "starting symbol" of Table 6.3.3.2-3 is the symbol index.

In case of time division duplex (TDD), semi-statically configured DL parts and/or actually transmitted synchronization signal blocks (SSBs) can override and invalidate some time-domain PRACH occasions defined in the PRACH configuration table. More specifically, PRACH occasions in the UL part are always valid, and a PRACH occasion within the X part is valid as long as it does not precede or collide with an SSB in the RACH slot and it is at least N symbols after the DL part and the last symbol of an SSB. N is 0 or 2 depending on PRACH format and subcarrier spacing.

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different frequency locations. The number of PRACH occasions frequency division multiplexed (FDMed) in one time domain PRACH occasion, can be 1, 2, 4, or 8. FIG. 2 illustrates an example of a PRACH occasion configuration in NR.

In NR Rel-15, there are up to 64 sequences that can be used as random-access preambles per PRACH occasion in each cell. The radio resource control (RRC) parameter totalNumberOfRA-Preambles determines how many of these 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

NR Rel-15 Association Between SSB and PRACH Occasion

NR Rel-15 supports one-to-one, one-to-many, and many-to-one association between SSB and PRACH occasions, as illustrated in FIGS. 3 and 4, for example.

When a WD detects one best SSB beam, a preamble in the set of one or more preambles mapped to this SSB will be selected for the random access. Then when the network node (e.g., gNB) detects the preamble, the best SSB beam for this WD is known indirectly so that best beams can be used for transmitting signals to or receiving signals from this WD.

The preambles associated to each SSB is configured by the two RRC parameters in the RACH-ConfigCommon: ssb-perRACH-OccasionAndCB-PreamblesPerSSB and totalNumberOfRA-Preambles.

The detailed mapping rule is specified in TS 38.213 section 8.1, version 15.6.0 as follows:

"A UE is provided a number N of SS/PBCH blocks associated with one PRACH occasion and a number R of contention based preambles per SS/PBCH block per valid PRACH occasion by ssb-perRACH-OccasionAndCB-PreamblesPerSSB. If N≥1, one SS/PBCH block is mapped to 1/N consecutive valid PRACH occasions and R contention based preambles with consecutive indexes associated with the SS/PBCH block per valid PRACH occasion start from preamble index 0. If R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ is provided by totalNumberOfRA-Preambles and is an integer multiple of N."

In other words, the mapping between SSB and preambles is done by consecutively associating M preambles to each SSB, where $M = N_{preamble}^{total}/N$, and as illustrated in FIG. 5, the preambles may be taken in the following order:

First, in increasing order of preamble indexes within a single PRACH occasion.

Second, in increasing order of frequency resource indexes for frequency multiplexed PRACH occasions.

Third, in increasing order of time.

For each SSB, the associated preambles per PRACH occasion are further divided into two sets for Contention-Based Random Access (CBRA) and Contention-Free Random Access (CFRA). The number of content-based (CB) preambles per SSB per PRACH occasion is signaled by the RRC parameter #CB-preambles-per-SSB. Preamble indices for CBRA and CFRA are mapped consecutively for one SSB in one PRACH occasion, as shown in FIG. 6.

Rel-15 SSB Selection

In the 4-step random access procedure, the WD selects an SSB with synchronization signal-reference signal received power (SS-RSRP) above rsrp-ThresholdSSB (if such SSB is available). The selected SSB will be indicated to the network node (e.g., gNB) either by the selected preamble or by the PRACH occasion (RO). This indication will enable the network node (e.g., gNB) to choose a suitable DL beam for the RAR transmission. The SSB selection for contention based Random Access is specified in TS 38.321, Section 5.1.2, version 15.6.0 according to:

"1>else (i.e. for the contention-based Random Access preamble selection):
  2>if at least one of the SSBs with SS-RSRP above rsrp-ThresholdSSB is available:
    3>select an SSB with SS-RSRP above rsrp-ThresholdSSB.
  2>else:
    3>select any SSB."

The preamble transmission (and mapping RO to SSB) is specified in the same document and same section according to:

"1>else if an SSB is selected above:
  2>determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to subclause 8.1 of TS 38.213, version 15.6.0, corresponding to the selected SSB; the MAC entity may take into account the possible occurrence of measurement gaps when determining the next available PRACH occasion corresponding to the selected SSB)."

Preamble Group Selection

In the 4-step random access procedure, the WD selects a Random Access Preambles group based on Msg3 size, logical channel and pathloss. This is based on an existing configuration of Random Access Preambles group B, and ra-Msg3SizeGroupA:

2>if Msg3 has not yet been transmitted:
    3>if Random Access Preambles group B is configured:
      4>if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower-msg3-DeltaPreamble-messagePowerOffsetGroupB; or
      4>if the Random Access procedure was initiated for the CCCH logical channel and the CCCH SDU size plus MAC subheader is greater than ra-Msg3SizeGroupA:
        5>select the Random Access Preambles group B.
      4>else:
        5>select the Random Access Preambles group A.
    3>else:
      4>select the Random Access Preambles group A.
  2>else (i.e. Msg3 is being retransmitted):
    3>select the same group of Random Access Preambles as was used for the Random Access Preamble transmission attempt corresponding to the first transmission of Msg3.

Where the parameters groupBconfigured (indicating if Random Access Preambles group B is configured) and ra-Msg3SizeGroupA are given in RACH-ConfigCommon while preambleReceivedTargetPower is found in RACH-ConfigGeneric.

2-Step RACH Work Item for Release 16 in 3GPP

A 2-step RACH work item was approved in the 3GPP RAN1 #82 plenary meeting.

The 2-step RACH includes completing the initial access in only two steps as illustrated in FIG. 7 and as described herein below:

Step 1: the WD sends a message A (msgA) including random access preamble (transmitted on the PRACH)

together with higher layer data such as RRC connection request possibly with some small payload on PUSCH. The part of message A transmitted on the PUSCH is herein often referred to as $MsgA_{PUSCH}$ or msgA PUSCH.

Step 2: the network node (e.g., gNB) sends a response (called message B or msgB), for example, including one or more of a WD identifier assignment, timing advance information, contention resolution message, backoff indication, and fallback command.

As can be seen by a comparison of 4-step and 2-step RA shown in FIG. 8, one of the benefits of 2-step RA is the latency gains. Depending on the numerology that is used in NR, the 2-step procedure could lead to a reduction of approximately factor 3 compared to the 4-step procedure.

SUMMARY

Some embodiments advantageously provide methods and apparatuses for PUSCH resource selection in 2-step random access (RA).

According to one aspect of the present disclosure, a method implemented in a wireless device for selecting resources for a two-step random access, RA, procedure is provided. The method includes receiving a two-step RA configuration for a cell from a network node, the two-step RA configuration comprising: a first resource allocation for a physical uplink shared channel, PUSCH, transmission of a first message, msgA, of the two-step RA procedure, the first resource allocation for the PUSCH transmission of the msgA being associated with a first set of preambles; and a second resource allocation for the PUSCH transmission of the msgA associated with a second set of preambles. The method includes selecting one of the first and second resource allocation and the associated one of the first and second set of preambles based on the two-step RA configuration and a payload size of the PUSCH transmission of the msgA. The method includes transmitting the PUSCH transmission of the msgA using the selected one of the first and second resource allocation.

In some embodiments of this aspect, the method further includes selecting a preamble for the msgA transmission of the two-step RA procedure from the selected one of the first and second set of preambles; and transmitting the selected preamble of the msgA. In some embodiments of this aspect, selecting one of the first and second resource allocation and associated one of the first and second set of preambles comprises: comparing the payload size of the PUSCH transmission of the msgA with a size threshold value associated with the first and second resource allocations of the two-step RA configuration; selecting the second resource allocation and associated second set of preambles when the payload size is greater than the size threshold value; and selecting the first resource allocation and associated first set of preambles otherwise.

In some embodiments of this aspect, the two-step RA configuration further comprises a pathloss threshold value associated with the second set of preambles, and wherein selecting one of the first and second resource allocation and the associated one of the first and second set of preambles further comprises: comparing an estimated downlink pathloss with the pathloss threshold value associated with the second set of preambles; and selecting the second resource allocation and associated second set of preambles only when the estimated downlink pathloss is less than the pathloss threshold value. In some embodiments of this aspect, the first and second resource allocation each comprises at least one of: time resources; frequency resources; modulation and coding scheme; transmit power instruction; and redundancy version. In some embodiments of this aspect, selecting one of the first and second resource allocation is based also on the respective modulation and coding scheme of the first and second resource allocation. In some embodiments of this aspect, selecting one of the first and second resource allocation is based also on the respective transmit power instruction of the first and second resource allocation.

In some embodiments of this aspect, the two-step RA configuration further comprises a transmit power threshold value associated with the first and second set of preambles and selecting one of the first and second resource allocation and associated one of the first and second set of preambles comprises: estimating a transmit power to transmit the PUSCH transmission of the msgA on the one of the first and second resource allocation; and selecting the one of the first and second resource allocation based on whether the estimated transmit power meets the transmit power threshold value. In some embodiments of this aspect, selecting the one of the first and second resource allocation and the associated one of the first and second set of preambles is based also on a logical channel for which the two-step RA procedure is performed. In some embodiments of this aspect, selecting one of the first and second resource allocation is based also on whether the wireless device is an Ultra-reliable Low Latency Communication, URLLC, device.

In some embodiments of this aspect, the method further includes selecting at least one beam from among a plurality of beams in the cell; determining that the selected beam is associated with the two-step RA configuration; and using the two-step RA configuration that is associated with the selected beam to select the one of the first and second resource allocation and the associated one of the first and second set of preambles. In some embodiments of this aspect, selecting the at least one beam further comprises selecting the at least one beam from among the plurality of beams in the cell based on a reference signal received power, RSRP, threshold. In some embodiments of this aspect, the at least one selected beam includes at least one of: a synchronization signal block, SSB, beam selected out of a plurality of SSB beams in the cell; and a channel state information reference signal, CSI-RS, beam selected out of a plurality of CSI-RS beams in the cell.

In some embodiments of this aspect, the 2-step RA configuration is comprised in one of: a PUSCH configuration mapped to the selected at least one beam, the PUSCH configuration indicating the first and second resource allocation for the PUSCH transmission of the msgA; a PUSCH configuration and a Physical Random Access Channel, PRACH, configuration, the PRACH configuration being mapped to the selected at least one beam and the PUSCH configuration being mapped to the PRACH configuration that is associated with the selected at least one beam; and a PUSCH configuration and a Physical Random Access Channel, PRACH, configuration, the PRACH configuration being mapped to the selected at least one beam and the PUSCH configuration being based on a logical channel for which the two-step RA procedure is performed.

In some embodiments of this aspect, the selected at least one beam is mapped to a plurality of frequency-multiplexed Random Access Channel, RACH, occasions in one time resource. In some embodiments of this aspect, a size of the first resource allocation for the PUSCH transmission of the msgA is different from a size of the second resource allocation for the PUSCH transmission of the msgA. In some embodiments of this aspect, the two-step RA configuration is received in system information. In some embodiments of this aspect, the method further includes determining a set of information bits for the PUSCH transmission of the msgA, the set of information bits corresponding to the payload; determining a transport block size according to at least one of a modulation and coding scheme, a number of orthogonal frequency division multiplexing, OFDM, symbols, and a number of physical resource blocks indicated in the one of the first and second resource allocation in the two-step RA configuration; when the set of information bits is less than or equal to the transport block size, transmitting the PUSCH transmission of the msgA including the information bits; and when the set of information bits is greater than the transport block size, removing at least one bit in the set of information bits based on a priority of a logical channel for which the two-step RA procedure is performed.

According to yet another aspect of the present disclosure, a method implemented in a network node configured to communicate with a wireless device is provided. The method includes transmitting a two-step random access, RA, configuration for a cell to the wireless device, the two-step RA configuration comprising: a first resource allocation for a physical uplink shared channel, PUSCH, transmission of a first message, msgA, of a two-step RA procedure, the first resource allocation for the PUSCH transmission of the msgA being associated with a first set of preambles; and a second resource allocation for the PUSCH transmission of the msgA associated with a second set of preambles; and receiving the PUSCH transmission of the msgA according to one of the first and second resource allocation, the one of the first and second resource allocation and the associated one of the first and second set of preambles being based on the two-step RA configuration and a payload size of the PUSCH transmission of the msgA.

In some embodiments of this aspect, the method further includes receiving a preamble of the msgA transmission of the two-step RA procedure, the preamble being from the one of the first and second set of preambles that is based on the two-step RA configuration and the payload size of the PUSCH transmission of the msgA. In some embodiments of this aspect, the two-step RA configuration further comprises a size threshold value associated with the first and second resource allocations of the two-step RA configuration; and receiving the PUSCH transmission of the msgA further comprises: when the payload size is greater than the size threshold value, receiving the PUSCH transmission of the msgA according to the second resource allocation and associated second set of preambles; and otherwise, receiving the PUSCH transmission of the msgA according to the first resource allocation and associated first set of preambles.

In some embodiments of this aspect, the two-step RA configuration further comprises a pathloss threshold value associated with the second set of preambles; and receiving the PUSCH transmission of the msgA further comprises receiving the PUSCH transmission of the msgA according to the second resource allocation and associated second set of preambles only when an estimated downlink pathloss is less than the pathloss threshold value. In some embodiments of this aspect, the first and second resource allocation each comprises at least one of: time resources; frequency resources; modulation and coding scheme; transmit power instruction; and redundancy version. In some embodiments of this aspect, the one of the first and second resource allocation used to receive the PUSCH transmission of the msgA being based also on the respective modulation and coding scheme of the first and second resource allocation.

In some embodiments of this aspect, the one of the first and second resource allocation used to receive the PUSCH transmission of the msgA being based also on the respective transmit power instruction of the first and second resource allocation. In some embodiments of this aspect, the two-step RA configuration further comprises a transmit power threshold value associated with the first and second set of preambles; and the one of the first and second resource allocation used to receive the PUSCH transmission of the msgA and the associated one of the first and second set of preambles is based on whether an estimated transmit power meets the transmit power threshold value.

In some embodiments of this aspect, the one of the first and second resource allocation used to receive the PUSCH transmission of the msgA being based also on a logical channel for which the two-step RA procedure is performed. In some embodiments of this aspect, the one of the first and second resource allocation used to receive the PUSCH transmission of the msgA being based also on whether the wireless device is an Ultra-reliable Low Latency Communication, URLLC, device. In some embodiments of this aspect, the PUSCH transmission of the msgA is received according to the two-step RA configuration associated with at least one beam in the cell that is selected by the wireless device.

In some embodiments of this aspect, the two-step RA configuration includes a reference signal received power, RSRP, threshold and the at least one beam in the cell is selected by the wireless device based on the RSRP threshold. In some embodiments of this aspect, the at least one selected beam includes at least one of: a synchronization signal block, SSB, beam selected out of a plurality of SSB beams in the cell; and a channel state information reference signal, CSI-RS, beam selected out of a plurality of CSI-RS beams in the cell.

In some embodiments of this aspect, the 2-step RA configuration is comprised in one of: a PUSCH configuration mapped to the selected at least one beam, the PUSCH configuration indicating the first and second resource allocation for the PUSCH transmission of the msgA; a PUSCH configuration and a Physical Random Access Channel, PRACH, configuration, the PRACH configuration being mapped to the selected at least one beam and the PUSCH configuration being mapped to the PRACH configuration that is associated with the selected at least one beam; and a PUSCH configuration and a Physical Random Access Channel, PRACH, configuration, the PRACH configuration being mapped to the selected at least one beam and the PUSCH configuration being based on a logical channel for which the two-step RA procedure is performed.

In some embodiments of this aspect, the selected at least one beam is mapped to a plurality of frequency-multiplexed Random Access Channel, RACH, occasions in one time resource. In some embodiments of this aspect, a size of the first resource allocation for the PUSCH transmission of the msgA is different from a size of the second resource allocation for the PUSCH transmission of the msgA. In some embodiments of this aspect, the two-step RA configuration is transmitted in system information. In some embodiments of this aspect, the two-step RA configuration indicates, for each of the first and second resource allocation for the PUSCH transmission of the msgA, at least one of a modulation and coding scheme, a number of orthogonal frequency division multiplexing, OFDM, symbols, and a number of physical resource blocks.

According to another aspect of the present disclosure, a wireless device for selecting resources for a two-step random access, RA, procedure, comprises processing circuitry. The processing circuitry is configured to cause the wireless device to receive a two-step RA configuration for a cell from a network node, the two-step RA configuration comprising: a first resource allocation for a physical uplink shared channel, PUSCH, transmission of a first message, msgA, of the two-step RA procedure, the first resource allocation for the PUSCH transmission of the msgA being associated with a first set of preambles; and a second resource allocation for the PUSCH transmission of the msgA associated with a second set of preambles. The processing circuitry is configured to cause the wireless device to select one of the first and second resource allocation and the associated one of the first and second set of preambles based on the two-step RA configuration and a payload size of the PUSCH transmission of the msgA. The processing circuitry is configured to cause the wireless device to transmit the PUSCH transmission of the msgA using the selected one of the first and second resource allocation.

In some embodiments of this aspect, the processing circuitry is configured to cause the wireless device to select a preamble for the msgA transmission of the two-step RA procedure from the selected one of the first and second set of preambles; and transmit the selected preamble of the msgA. In some embodiments of this aspect, the processing circuitry is configured to cause the wireless device to select one of the first and second resource allocation and associated one of the first and second set of preambles by being configured to cause the wireless device to: compare the payload size of the PUSCH transmission of the msgA with a size threshold value associated with the first and second resource allocations of the two-step RA configuration; select the second resource allocation and associated second set of preambles when the payload size is greater than the size threshold value; and select the first resource allocation and associated first set of preambles otherwise.

In some embodiments of this aspect, the two-step RA configuration further comprises a pathloss threshold value associated with the second set of preambles; and the processing circuitry is configured to cause the wireless device to select one of the first and second resource allocation and the associated one of the first and second set of preambles by being configured to cause the wireless device to: compare an estimated downlink pathloss with the pathloss threshold value associated with the second set of preambles; and select the second resource allocation and associated second set of preambles only when the estimated downlink pathloss is less than the pathloss threshold value.

In some embodiments of this aspect, the first and second resource allocation each comprises at least one of: time resources; frequency resources; modulation and coding scheme; transmit power instruction; and redundancy version. In some embodiments of this aspect, the processing circuitry is configured to cause the wireless device to select one of the first and second resource allocation based also on the respective modulation and coding scheme of the first and second resource allocation. In some embodiments of this aspect, the processing circuitry is configured to cause the wireless device to select one of the first and second resource allocation based also on the respective transmit power instruction of the first and second resource allocation.

In some embodiments of this aspect, the two-step RA configuration further comprises a transmit power threshold value associated with the first and second set of preambles; and the processing circuitry is configured to cause the wireless device to select one of the first and second resource allocation and associated one of the first and second set of preambles by being configured to: estimate a transmit power to transmit the PUSCH transmission of the msgA on the one of the first and second resource allocation; and select the one of the first and second resource allocation based on whether the estimated transmit power meets the transmit power threshold value. In some embodiments of this aspect, the processing circuitry is configured to cause the wireless device to select the one of the first and second resource allocation and the associated one of the first and second set of preambles based also on a logical channel for which the two-step RA procedure is performed. In some embodiments of this aspect, the processing circuitry is configured to cause the wireless device to select one of the first and second resource allocation based also on whether the wireless device is an Ultra-reliable Low Latency Communication, URLLC, device.

In some embodiments of this aspect, the processing circuitry is further configured to cause the wireless device to: select at least one beam from among a plurality of beams in the cell; determine that the selected beam is associated with the two-step RA configuration; and use the two-step RA configuration that is associated with the selected beam to select the one of the first and second resource allocation and the associated one of the first and second set of preambles. In some embodiments of this aspect, the processing circuitry is configured to cause the wireless device to select the at least one beam by being configured to cause the wireless device to select the at least one beam from among the plurality of beams in the cell based on a reference signal received power, RSRP, threshold. In some embodiments of this aspect, the at least one selected beam includes at least one of: a synchronization signal block, SSB, beam selected out of a plurality of SSB beams in the cell; and a channel state information reference signal, CSI-RS, beam selected out of a plurality of CSI-RS beams in the cell.

In some embodiments of this aspect, the 2-step RA configuration is comprised in one of: a PUSCH configuration mapped to the selected at least one beam, the PUSCH configuration indicating the first and second resource allocation for the PUSCH transmission of the msgA; a PUSCH configuration and a Physical Random Access Channel, PRACH, configuration, the PRACH configuration being mapped to the selected at least one beam and the PUSCH configuration being mapped to the PRACH configuration that is associated with the selected at least one beam; and a PUSCH configuration and a Physical Random Access Channel, PRACH, configuration, the PRACH configuration being mapped to the selected at least one beam and the PUSCH configuration being based on a logical channel for which the two-step RA procedure is performed.

In some embodiments of this aspect, the selected at least one beam is mapped to a plurality of frequency-multiplexed Random Access Channel, RACH, occasions in one time resource. In some embodiments of this aspect, a size of the first resource allocation for the PUSCH transmission of the msgA is different from a size of the second resource allocation for the PUSCH transmission of the msgA. In some embodiments of this aspect, the two-step RA configuration is received in system information. In some embodiments of this aspect, the processing circuitry is further configured to cause the wireless device to: determine a set of information bits for the PUSCH transmission of the msgA, the set of information bits corresponding to the payload; determine a transport block size according to at least one of a modulation and coding scheme, a number of orthogonal frequency division multiplexing, OFDM, symbols, and a number of physical resource blocks indicated in the one of the first and second resource allocation in the two-step RA configuration; when the set of information bits is less than or equal to the transport block size, transmit the PUSCH transmission of the msgA including the information bits; and when the set of information bits is greater than the transport block size, remove at least one bit in the set of information bits based on a priority of a logical channel for which the two-step RA procedure is performed.

According to another aspect of the present disclosure, a network node configured to communicate with a wireless device is provided. The network node includes processing circuitry. The processing circuitry is configured to cause the network node to transmit a two-step random access, RA, configuration for a cell to the wireless device, the two-step RA configuration comprising: a first resource allocation for a physical uplink shared channel, PUSCH, transmission of a first message, msgA, of a two-step RA procedure, the first resource allocation for the PUSCH transmission of the msgA being associated with a first set of preambles; and a second resource allocation for the PUSCH transmission of the msgA associated with a second set of preambles. The processing circuitry is configured to cause the network node to receive the PUSCH transmission of the msgA according to one of the first and second resource allocation, the one of the first and second resource allocation and the associated one of the first and second set of preambles being based on the two-step RA configuration and a payload size of the PUSCH transmission of the msgA.

In some embodiments of this aspect, the processing circuitry is configured to cause the network node to receive a preamble of the msgA transmission of the two-step RA procedure, the preamble being from the one of the first and second set of preambles that is based on the two-step RA configuration and the payload size of the PUSCH transmission of the msgA. In some embodiments of this aspect, the two-step RA configuration further comprises a size threshold value associated with the first and second resource allocations of the two-step RA configuration; and the processing circuitry is configured to cause the network node to receive the PUSCH transmission of the msgA by being configured to cause the network node to: when the payload size is greater than the size threshold value, receive the PUSCH transmission of the msgA according to the second resource allocation and associated second set of preambles; and otherwise, receive the PUSCH transmission of the msgA according to the first resource allocation and associated first set of preambles.

In some embodiments of this aspect, the two-step RA configuration further comprises a pathloss threshold value associated with the second set of preambles; and the processing circuitry is configured to cause the network node to receive the PUSCH transmission of the msgA by being configured to cause the network node to: receive the PUSCH transmission of the msgA according to the second resource allocation and associated second set of preambles only when an estimated downlink pathloss is less than the pathloss threshold value. In some embodiments of this aspect, the first and second resource allocation each comprises at least one of: time resources; frequency resources; modulation and coding scheme; transmit power instruction; and redundancy version. In some embodiments of this aspect, the one of the first and second resource allocation used to receive the PUSCH transmission of the msgA being based also on the respective modulation and coding scheme of the first and second resource allocation.

In some embodiments of this aspect, the one of the first and second resource allocation used to receive the PUSCH transmission of the msgA being based also on the respective transmit power instruction of the first and second resource allocation. In some embodiments of this aspect, the two-step RA configuration further comprises a transmit power threshold value associated with the first and second set of preambles; and the one of the first and second resource allocation used to receive the PUSCH transmission of the msgA and the associated one of the first and second set of preambles is based on whether an estimated transmit power meets the transmit power threshold value.

In some embodiments of this aspect, the one of the first and second resource allocation used to receive the PUSCH transmission of the msgA being based also on a logical channel for which the two-step RA procedure is performed. In some embodiments of this aspect, the one of the first and second resource allocation used to receive the PUSCH transmission of the msgA being based also on whether the wireless device is an Ultra-reliable Low Latency Communication, URLLC, device. In some embodiments of this aspect, the PUSCH transmission of the msgA is received according to the two-step RA configuration associated with at least one beam in the cell that is selected by the wireless device.

In some embodiments of this aspect, the two-step RA configuration includes a reference signal received power, RSRP, threshold and the at least one beam in the cell is selected by the wireless device based on the RSRP threshold. In some embodiments of this aspect, the at least one selected beam includes at least one of: a synchronization signal block, SSB, beam selected out of a plurality of SSB beams in the cell; and a channel state information reference signal, CSI-RS, beam selected out of a plurality of CSI-RS beams in the cell.

In some embodiments of this aspect, the 2-step RA configuration is comprised in one of: a PUSCH configuration mapped to the selected at least one beam, the PUSCH configuration indicating the first and second resource allocation for the PUSCH transmission of the msgA; a PUSCH configuration and a Physical Random Access Channel, PRACH, configuration, the PRACH configuration being mapped to the selected at least one beam and the PUSCH configuration being mapped to the PRACH configuration that is associated with the selected at least one beam; and a PUSCH configuration and a Physical Random Access Channel, PRACH, configuration, the PRACH configuration being mapped to the selected at least one beam and the PUSCH configuration being based on a logical channel for which the two-step RA procedure is performed.

In some embodiments of this aspect, the selected at least one beam is mapped to a plurality of frequency-multiplexed Random Access Channel, RACH, occasions in one time resource. In some embodiments of this aspect, a size of the first resource allocation for the PUSCH transmission of the msgA is different from a size of the second resource allocation for the PUSCH transmission of the msgA. In some embodiments of this aspect, the two-step RA configuration is transmitted in system information. In some embodiments of this aspect, the two-step RA configuration indicates, for each of the first and second resource allocation for the PUSCH transmission of the msgA, at least one of a modulation and coding scheme, a number of orthogonal frequency division multiplexing, OFDM, symbols, and a number of physical resource blocks.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart illustrating exemplary methods implemented in a communication system including a host computer, a network node and a wireless device for executing a client application at a wireless device according to some embodiments of the present disclosure;

FIG. 12 is a flowchart illustrating exemplary methods implemented in a communication system including a host computer, a network node and a wireless device for receiving user data at a wireless device according to some embodiments of the present disclosure;

DETAILED DESCRIPTION

Figure 1:
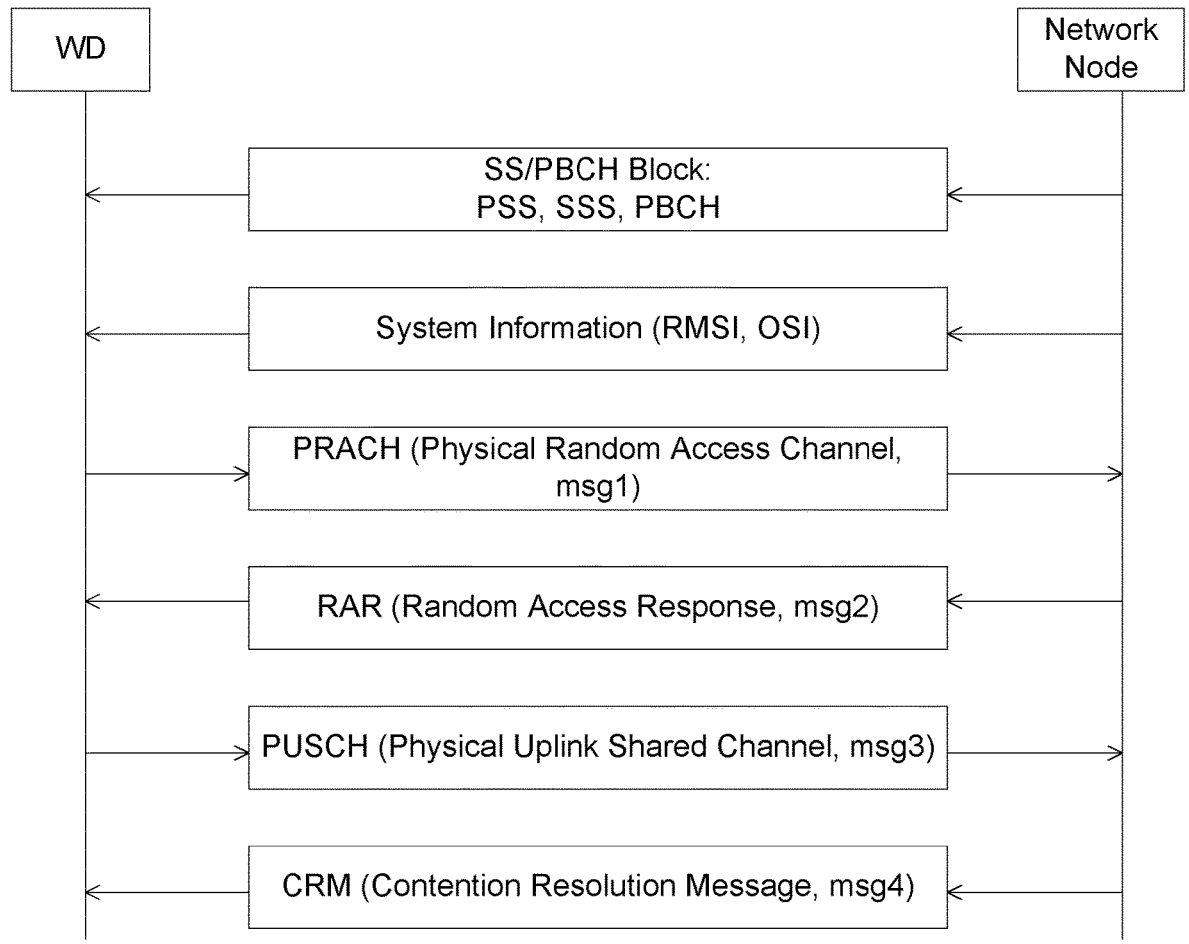
FIG. 1 illustrates an example of a 4-step random access procedure.
Figure 2:
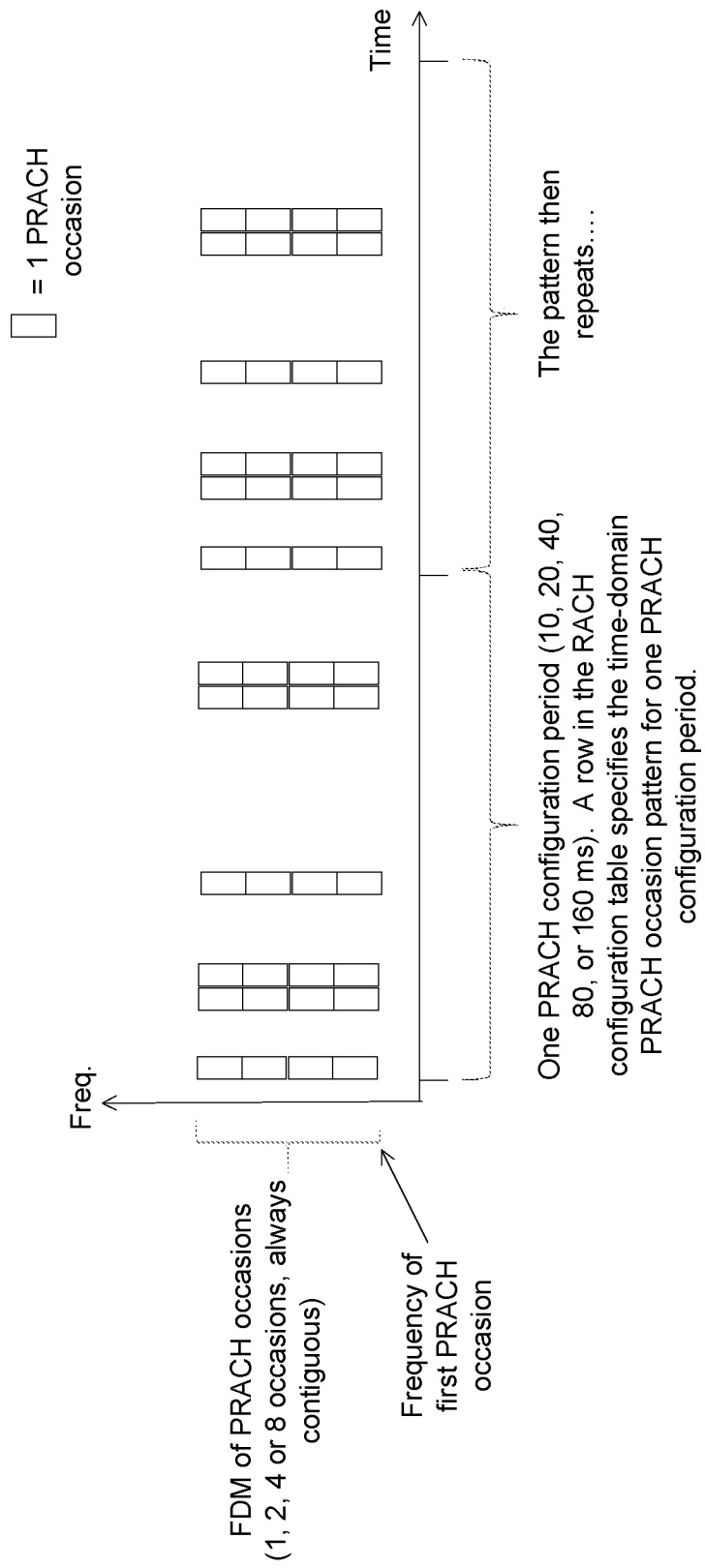
FIG. 2 illustrates an example of PRACH configuration in NR.
Figure 3:
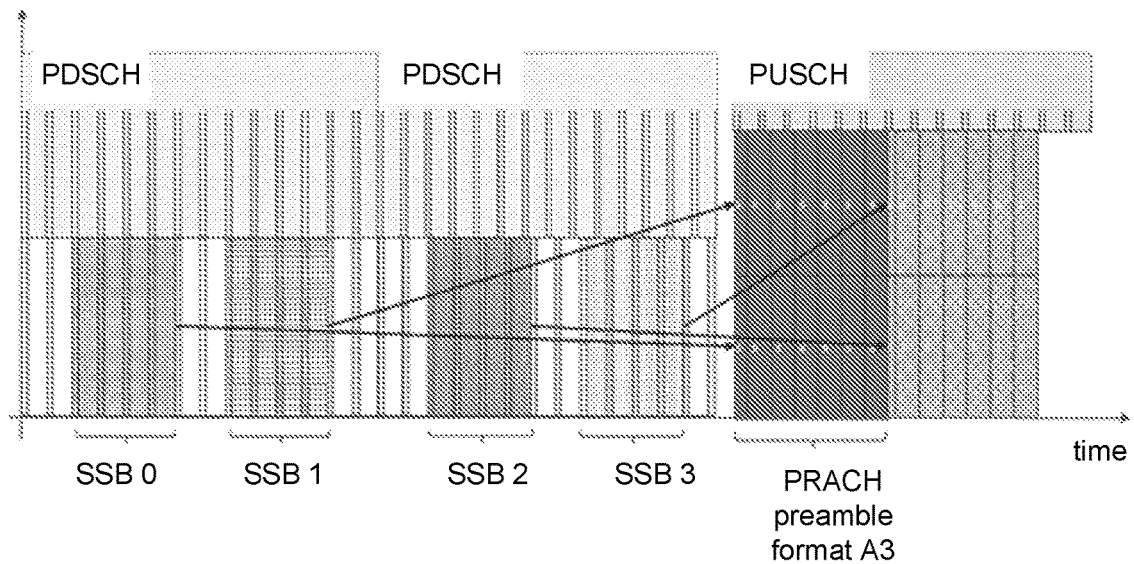
FIG. 3 illustrates an example of one SSB per PRACH occasion.
Figure 4:
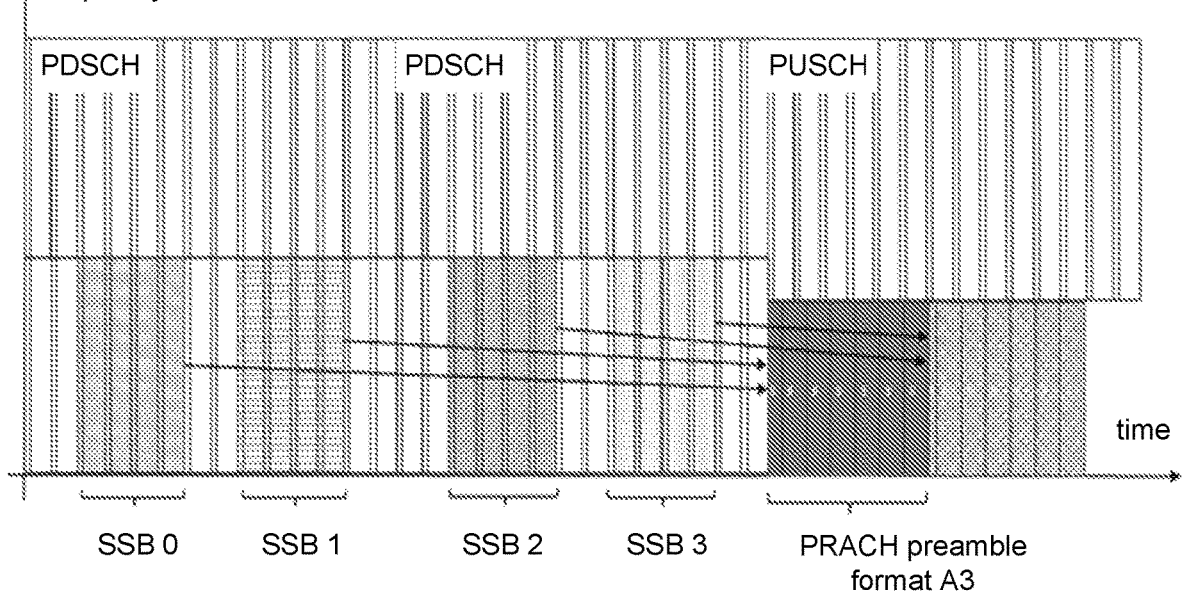
FIG. 4 illustrates an example with 2 SSBs per PRACH occasion.
Figure 5:
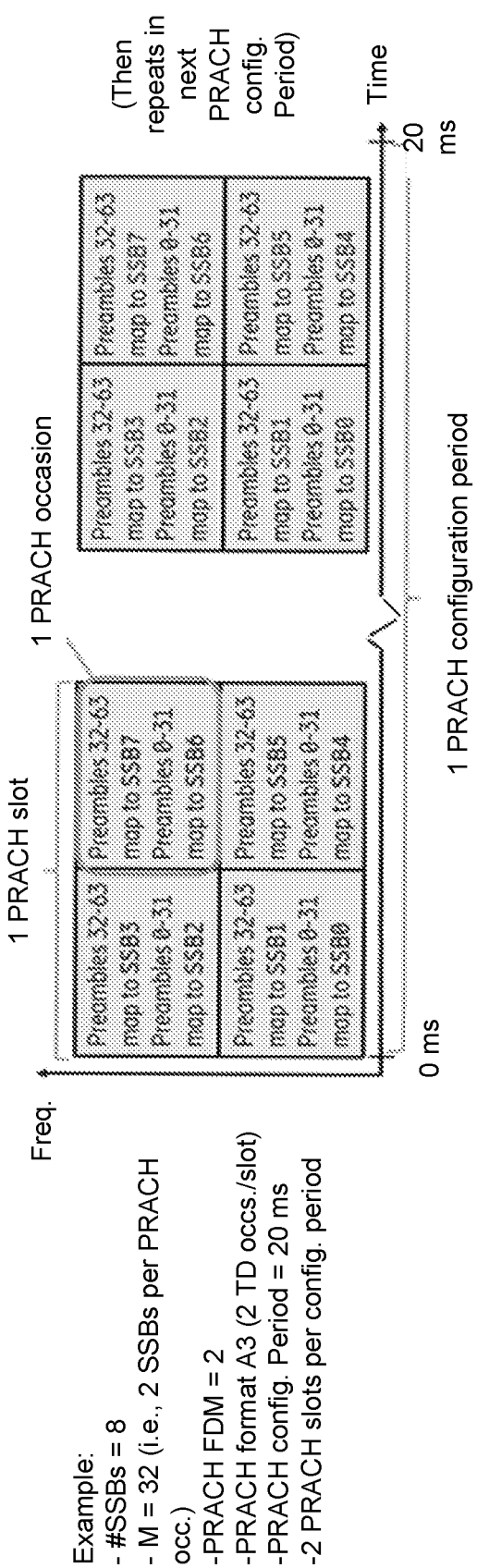
FIG. 5 illustrates an example of the mapping between SSB and random-access preambles.
Figure 6:
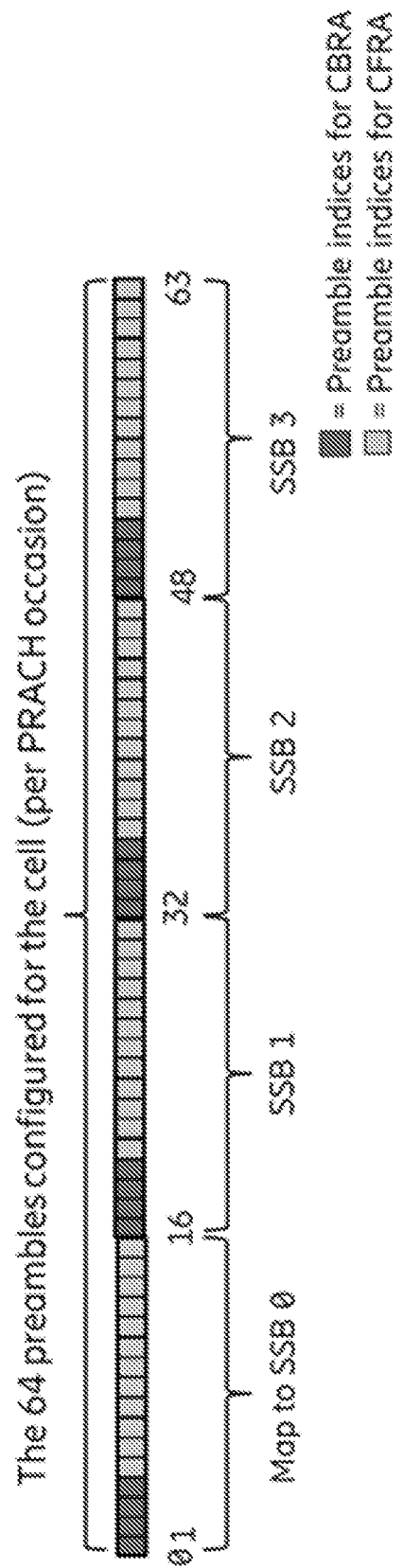
FIG. 6 illustrates an example of the associated preambles for CBRA and CFRA per SSB per PRACH occasion.
Figure 7:
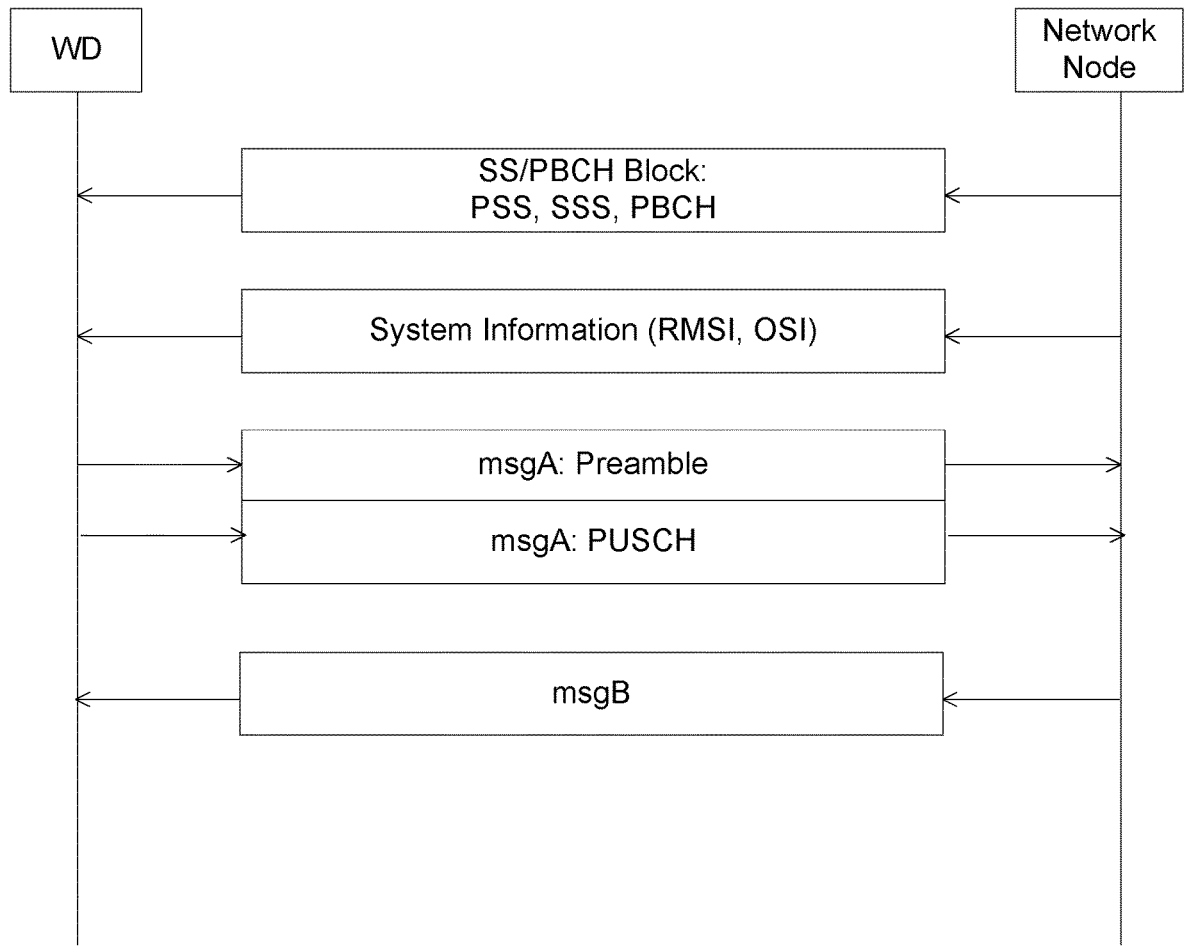
FIG. 7 illustrates an example of a two-step initial access procedure.
Figure 8:
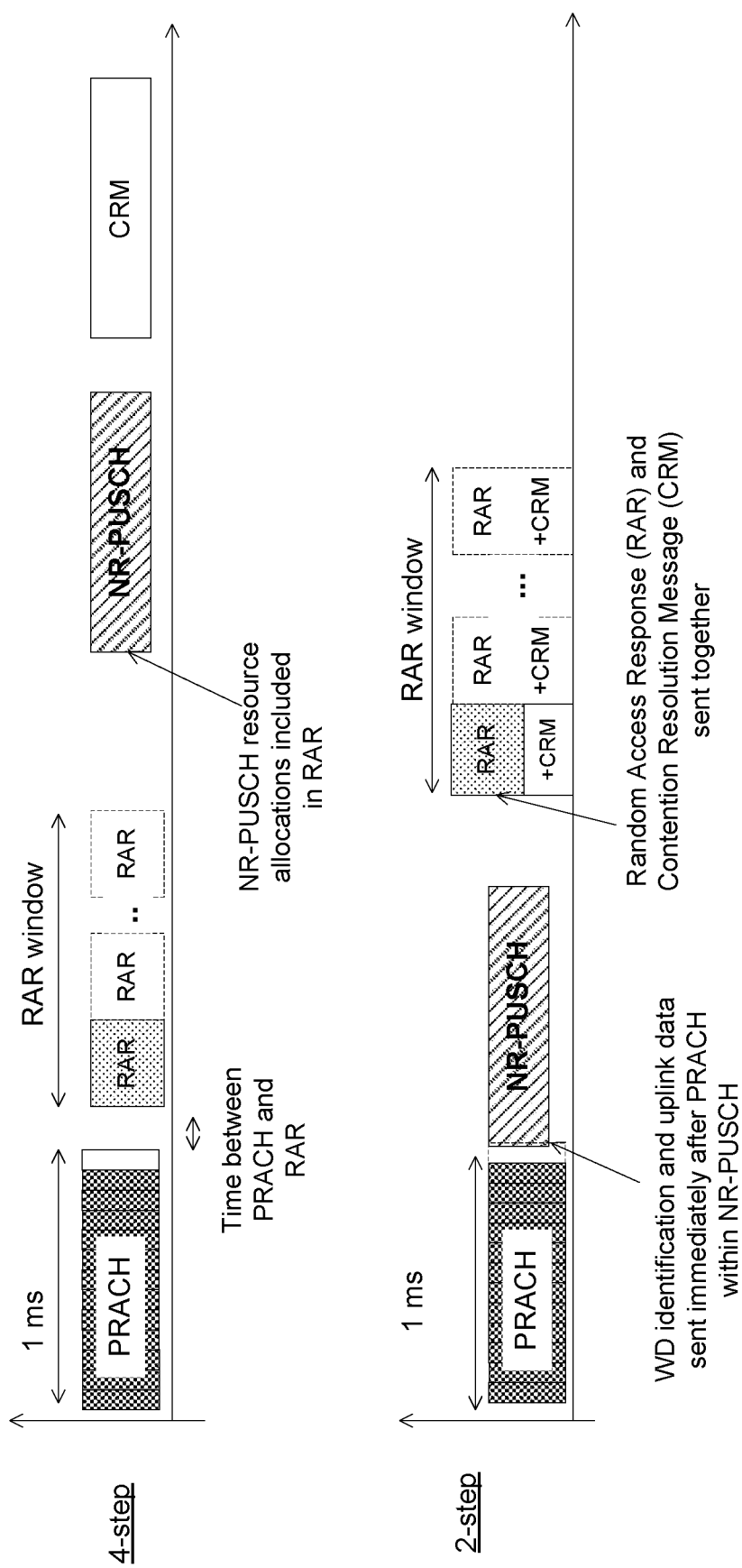
FIG. 8 illustrates an example of 4-step and 2-step RA procedures.

For 2-step RA, there may be an association between the random access preamble and the PUSCH transmission resource (that is, a PUSCH resource unit within a PUSCH occasion (PO)) to be used for $MsgA_{PUSCH}$. Such preamble-PUSCH resource associations could be many-to-one, one-to-one or even one-to-many.

Both the case where the 2-step RO and 4-step RO are shared, and the case that the 2-step RO and 4-step RO are separately configured may be considered.

Considerations:
For the relation of PRACH resources between 2-step and 4-step RACH, the network may have the flexibility to configure the following options:
Option 1: Separate ROs are configured for 2-step and 4-step RACH.
Option 2: Shared RO but separate preambles for 2-step and 4-step RACH.

Hence, there may be a set of preambles that are dedicated for use for 2-step RA in a cell when the 2-step RO and 4-step RO are shared. Otherwise, separate PRACH resources (e.g. time/frequency resources) may be provided for 2-step RA. In the latter case, there may for instance be N frequency multiplexed PRACH resources (i.e., occurring simultaneously but on different frequencies, e.g. different subcarriers), where M (M≤N) of these PRACH resources are associated with regular 4-step RA, while the remaining N-M PRACH resources are associated with 2-step RA.

In the 2-step random access procedure, no considerations have been made regarding PUSCH resource selection based on a threshold (of the transmission) payload size. However, the modulation and coding state/scheme (MCS) and/or transport block size (TBS) may be configured for msgA PUSCH, as seen below:

Considerations:
The following parameters may be defined per msgA PUSCH configuration:
Common parameters for both option 1 (separate configuration) and option 2 (relative location), may at least include:
MCS and/or transport block size (TBS) (to be further decided);
Number of FDMed POs;
POs (including guard band or guard period, if exist) under the same msgA PUSCH configurations are consecutive in frequency domain;
Number of PRBs per PO;
Number of DMRS symbols/ports/sequences (if support) per PO;
For further study (FFS) whether or not to support repetitions for msgA PUSCH;
FFS bandwidth of PRB-level guard band or duration of guard time;
FFS PUSCH mapping type;
Parameters specific to option 1 (separate configuration), at least include:
Periodicity (msgA PUSCH configuration period); FFS value range;
Offset(s) (e.g., symbol, slot, subframe, etc.);
Time domain resource allocation, details FFS, e.g., in a slot for msgA PUSCH: starting symbol, number of symbols per PO, number of time-domain POs, etc.;
Frequency starting point;
Parameters specific to option 2, may at least include:
Single time offset (combination of slot-level and symbol-level indication) with respect to a reference point;
FFS, e.g., each PRACH slot (e.g., start or end of the PRACH slot), etc.;
Number of symbols per PO;
FFS explicit or implicit indication;
Single frequency offset with respect to FFS (the start of the first RO in frequency or the end of the last RO in frequency);
FFS: Number of TDMed POs;
Support multiple msgA PUSCH configurations for a WD;
FFS the maximum number of configurations;

FFS which parameters, if any, are common for all configurations;

FFS indication of different msgA PUSCH configurations, e.g. by different ROs, by different preamble groups, or by uplink control information (UCI);

FFS whether or not resources for different msgA PUSCHs can be overlapped in time-frequency, and if so, any specification impact;

FFS whether the frequency resource of msgA PUSCH should be limited to the bandwidth of PRACH;

FFS validation rule of msgA PUSCH;

The following are considerations on power control for msgA PUSCH:

Considerations: During MsgA PUSCH retransmissions, the MsgA PUSCH transmit (Tx) power in transmission instance i is $P_{PUSCH}(i)$, where $P_{PUSCH}(i) = \max(P_{CMAX}, [MsgA]preambleReceivedTargetPower + \Delta_{MsgA\_PUSCH} + 10 \log_{10}(2^\mu M_{RB}^{PUSCH}(i)) + \alpha PL(i) + \Delta_{rampup}(i))$, ΔMsgA_PUSCH is an offset relative to the preamble received target power that could be configured for 2-step RACH. If the offset parameter is absent, the parameter delta_preamble_msg3 of 4-step RACH is used.

[Working Assumption] The power component from the transport format $\Delta_{TF}(i)$ is determined based on the same mechanism and the same parameter deltaMCS of Rel-15 Msg3 for the current transmission instance.

The power component from pathloss compensation, αPL(i), is determined by an alpha parameter, which is WD specific that is configured for 2-step separate from that of 4-step RACH. If the 2-step RACH alpha parameter is absent, the parameter msg3-alpha of 4-step RACH is used.

FFS: cell-specific MsgA PUSCH alpha.

For the downlink pathloss estimate for MsgA PUSCH power control, the WD uses the same RS resource index as that used for the corresponding MsgA PRACH.

The power ramping component is given by;

$\Delta_{rampup}(i) =$ $\min\left\{\left[\max\left(0, P_{CMAX} - \left[\begin{array}{c}10\log_{10}(2^\mu M_{RB}^{PUSCH}(i)) + \\ [MsgA]preambleReceivedTargetPower + \\ \Delta_{MsgA\_PUSCH} + \alpha PL(i) + \Delta_{TF}(i)\end{array}\right]\right)\right], \Delta_{rampuprequested}\right\}$, Where, $\Delta_{rampuprequested}$ is the requested ramp up from higher layers.

Further study and down select from the following alternatives:

Alt1: Same ramp up for MsgA PUSCH and MsgA PRACH $\Delta_{rampuprequested}$=(PREAMPLE_POWER_RAMPING_COUNTER−1)×[MsgA]powerRampingStep;

FFS: same power ramping counters for 2-step RACH MsgA PRACH and 4-step RACH Msg1;

Alt 2: Separate ramp up for MsgA PUSCH and MsgA PRACH, with different counters $\Delta_{rampuprequested}$=(MSGAPUSCH_POWER_RAMPING_COUNTER−1)×PUSCHpowerRampingStep; and Alt3: Separate ramp up for MsgA PUSCH and MsgA PRACH, with the same counter;

$\Delta_{rampuprequested}$=(PREAMBLE_POWER_RAMPING_COUNTER−1)×PUSCHpowerRampingStep.

The 2-step RA procedure may have benefits in that this procedure reduces the access delay and, for NR-U (NR Unlicensed), can also reduce the number of times the channel has to be accessed through a 'listen-before-talk' (LBT) process. However, there can be a cost in terms of transmission resources, since PUSCH transmission resources used for the transmission of $MsgA_{PUSCH}$ (e.g., an RRCSetupRequest message, an RRCResumeRequest message or a handover complete like message, such as RRCReconfigurationComplete) have to be reserved for each 2-step RA occasion, regardless whether they are used or not. In addition, the $MsgA_{PUSCH}$ transmissions are not very resource-efficient in themselves, because they are transmitted without dynamic link adaptation (for example since, excluding the preamble on the PRACH, this is the first transmission to the network, a default configuration is used). Hence, the 2-step RA, including configuration of 2-step RA occasions (PRACH resources and PUSCH resources), should be used with care and it may be beneficial to provide methods for selectively applying the 2-step RA based on relevant criteria. Ideally, a PUSCH resource selection may try to match the corresponding $MsgA_{PUSCH}$ payload size such that all PUSCH Transport Block (TB) resources are carrying user data and do not include padding bits.

Some embodiments of the present disclosure propose arrangements for leveraging the observations that 1) the property of 5G/NR allows not only WD-specific transmission-tailoring, but also differentiation of the treatment of physical layer transmission resources; and 2) the properties (e.g., average load) and requirements (e.g., capacity/throughput, reliability, etc.) can differ between different types of payload triggering a request for transmission resources.

Some embodiments of the present disclosure include both network node aspects and WD aspects, the network node aspects being elaborated first below.

Some network node aspects of the present disclosure include leveraging the above observations. For example, the network may have the flexibility to selectively configure support for 2-step RA associated with different amounts of PRACH transmission resources devoted for 2-step RA and/or gradual differences in the number and size of PUSCH allocations, e.g., varying the relation between the number of 2-step preambles, the number and size of PUSCH allocations, e.g., the number of preambles mapping to the PUSCH allocation and a set of PUSCH resource sizes.

As for the WD aspects, some embodiments include a method at a wireless device (also called a User Equipment—UE) for performing random access with PUSCH resource selection, the method comprising one or more of the following:

Obtaining random-access configuration(s), for example for a target cell, comprising one 2-step random access (RA) configuration for all beams, for each beam or for groups of beams that may include a threshold or thresholds for PUSCH resource selection related to a selected RO.

Configurations may be provided in a handover command (RRCReconfiguration with reconfiguration with sync), reconfiguration message (RRCReconfiguration), as part of a beam failure recovery (BFR) configuration, broadcasted in system information, etc.

Configurations may be mapped per beam directly or indirectly. For example, there may be a relation between a selected beam and a PRACH configuration, then a relation between PRACH configuration and a 2-step RA configuration.

The "related to a selected RO" here can also be "related to both a selected RO and a selected preamble" when a one-to-multiple mapping is applied between preamble and PUSCH resource. The "related to a selected RO" here can also mean one or a multiple of ROs (if exists) FDMed with the selected RO, since same beam is assumed among these FDMed POs.

Triggering random access (e.g. upon request from upper layers).

Performing beam selection.

That may be, for example, an SSB selection e.g. based on radio conditions, where the WD selects the SSB with highest RSRP among the detected SSBs for the concerned cell. The cell in which the WD performs SSB selection may be the serving cell during transition from RRC_IDLE or RRC_INACTIVE state to RRC_CONNECTED state or when a WD in RRC_CONNECTED state re-acquires a valid timing advance, or the cell may be a target cell, or potential target cell, in conjunction with handover. In conjunction with handover, the beam selection may include selection of CSI-RS beam in the target cell.

This may be considered at least similar to what is called in the 3GPP NR MAC technical specification (TS) 38.321, version 15.6.0 "Random Access Resource selection", where the selected beam (e.g. selected SSB) maps to a resource to transmit the preamble (however, in the case of 2-step RA, the selected beam may also map to resources for transmission of $MsgA_{PUSCH}$ on PUSCH).

Determining whether the selected beam (e.g., selected SSB) has an associated 2-step RACH configuration. Note that 2-step RACH configurations may be associated with all beams (i.e., all SSBs or all CSI-RSs), a subset of the beams (i.e., a subset of the SSBs or CSI-RSs) or none of the beams (i.e., none of the SSBs or CSI-RSs).

The 2-step RA (configuration) in this context may be a PRACH configuration and a mapping between the PRACH configuration associated with the selected beam and a PUSCH configuration (i.e., indication of PUSCH transmission resources and their selection for transmission of $MsgA_{PUSCH}$).

If all beams (e.g., SSBs or CSI-RSs) have associated 2-step RACH configurations, then this determination step may be performed beforehand once and for all when the system information (SIB1) (or handover command in the form of an RRCReconfiguration with a reconfiguration with sync IE) containing the SSB/CSI-RS to PRACH (and PUSCH) configuration is acquired. Note that a determination which may still remain upon every new beam (e.g., SSB or CSI-RS) selection is which 2-step RACH configuration the SSB is associated with.

Determining if the 2-step RA configuration has different sizes of PUSCH resources (can support transmission of different sizes of TBs)

Based on the expected payload size (e.g., TBS) of msgA PUSCH and possibly radio conditions, determine proper random access resources (preamble and PUSCH resource) that provides a robust transmission of msgA PUSCH.

Selecting a preamble and msgA PUSCH resource based on the configured selection criterion (e.g., thresholds) for the msgA PUSCH size, radio conditions (e.g., pathloss) and logical channel (e.g., common control channel or CCCH).

Some embodiments advantageously allow for the network/network node, e.g., gNB, to be able to configure the 2-step random access procedure to allow the WD to select suitable random access resources that fulfill the appropriate size of msgA PUSCH transmission in an optimal way.

Before describing in detail exemplary embodiments, it is noted that the embodiments reside primarily in combinations of apparatus components and processing steps related to PUSCH resource selection in 2-step random access (RA). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "msgA" is used to indicate a PUSCH transmitted in a two-step RA procedure. However, it is contemplated that the terminology "msgA" may be changed in the future and thus, some embodiments of the present disclosure are not limited to this specific terminology, which may change, but rather to the underlying principles, arrangements and concepts disclosed herein.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node 16), configures a WD 22, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Receiving (or obtaining) information may comprise receiving one or more information messages (e.g., 2-step RA configuration information). It may be considered that receiving signaling comprises demodulating and/or decoding and/or detecting, e.g., one or more messages, in particular a message carried by the signaling, e.g. based on an assumed set of resources, which may be searched and/or listened for the information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or, e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g., downlink data and/or downlink control signaling and/or DCI and/or uplink control or data or communication signaling, in particular acknowledgement signaling, and/or configuring resources and/or a resource pool therefor.

Any two or more embodiments described in this disclosure may be combined in any way with each other.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 9:
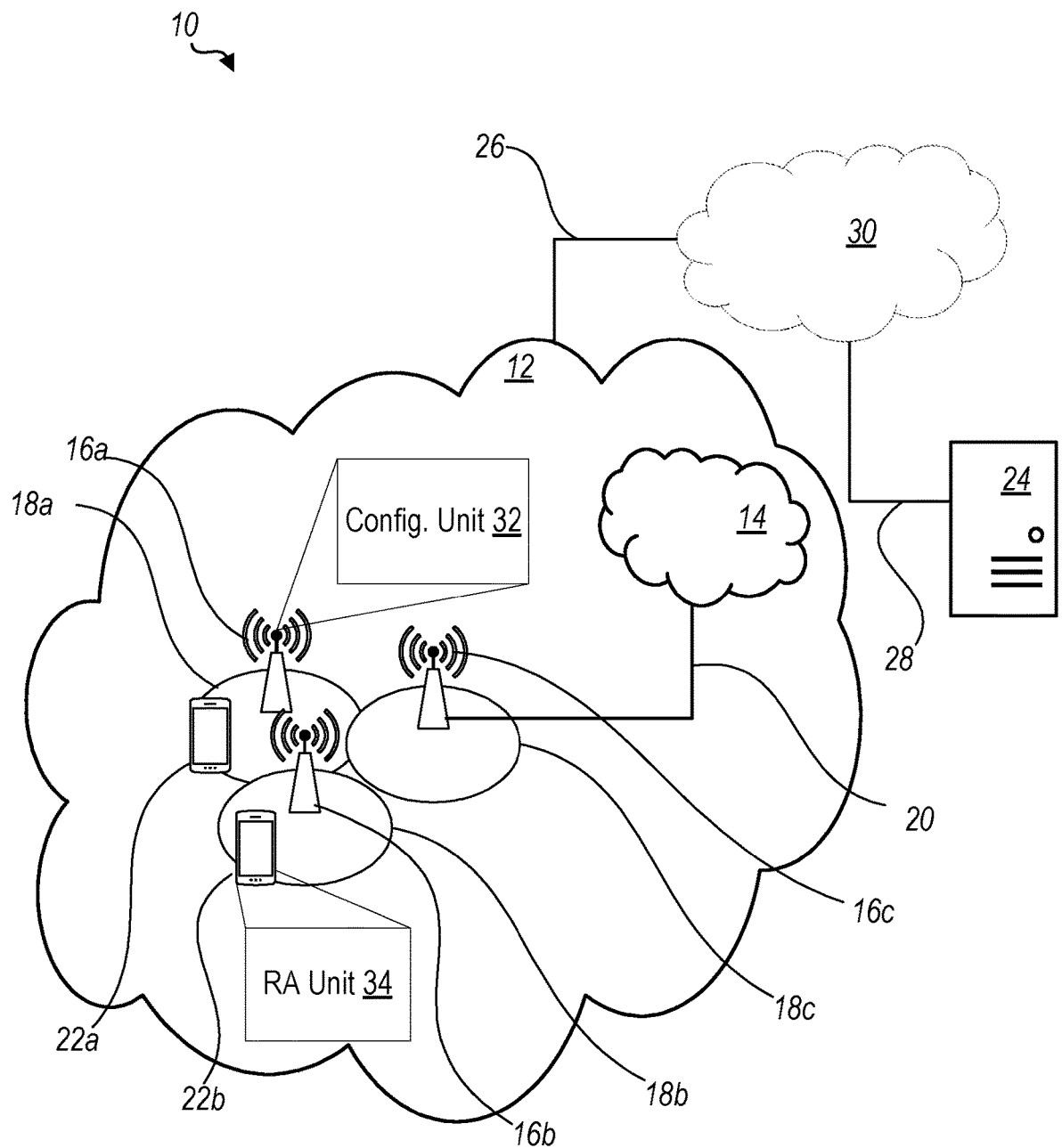
FIG. 9 is a schematic diagram of an exemplary network architecture illustrating a communication system connected via an intermediate network to a host computer according to the principles in the present disclosure.

Some embodiments provide for PUSCH resource selection in 2-step random access (RA). Referring again to the drawing figures, in which like elements are referred to by like reference numerals, there is shown in FIG. 9 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 9 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure the WD 22 for 2-step RA according to the principles in the present disclosure. A wireless device 22 is configured to include an RA unit 34 which is configured to perform 2-step RA according to the principles in the present disclosure.

Example implementations, in accordance with an embodiment, of the WD 22, network node 16 and host computer 24 discussed in the preceding paragraphs will now be described with reference to FIG. 10. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform the network node methods discussed herein, such as the methods discussed with reference to FIG. 15 and other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a Random Access (RA) unit 34 configured to perform the WD methods discussed herein, such as the methods discussed with reference to FIG. 16 and other figures.

Figure 10:
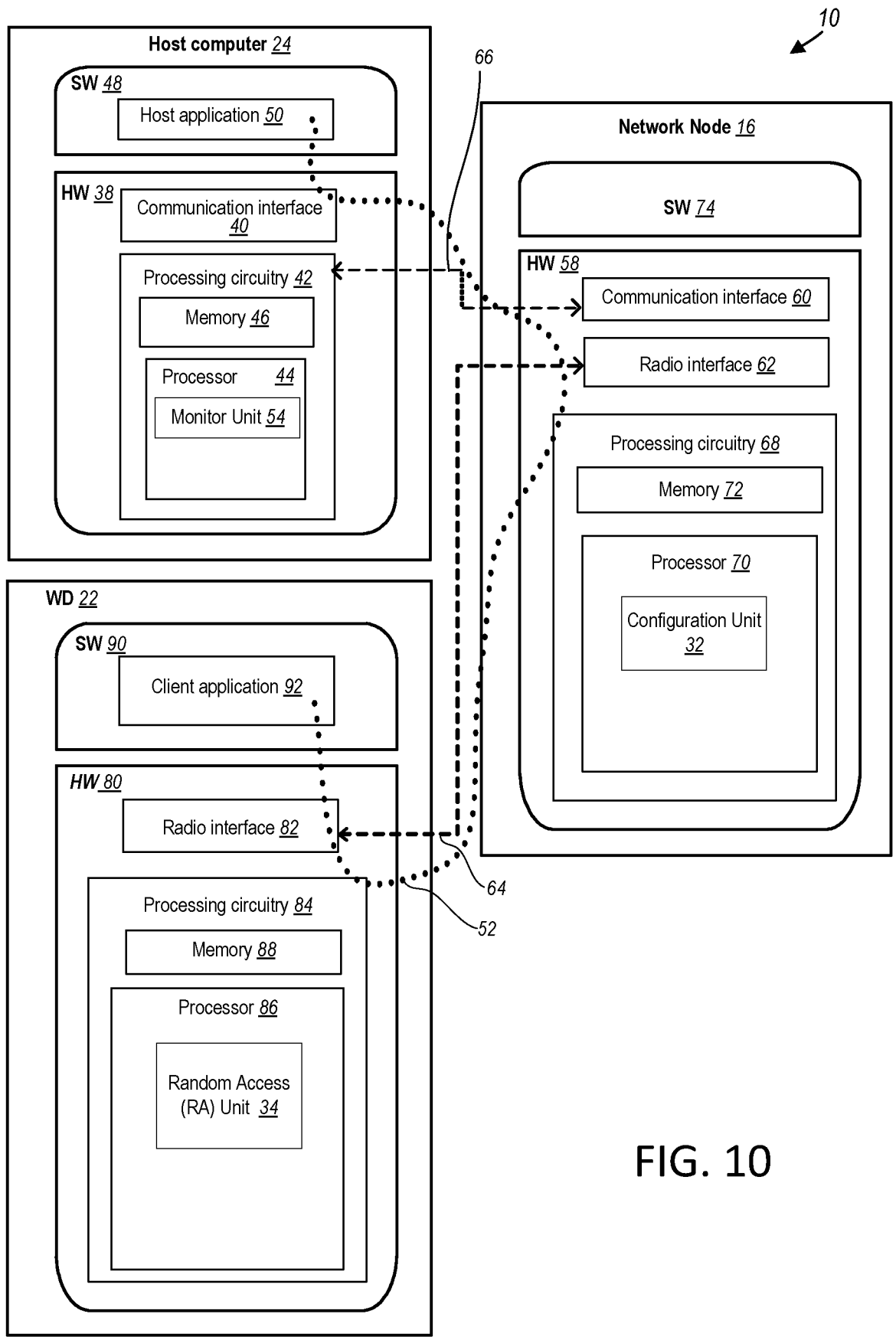
FIG. 10 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 10 and independently, the surrounding network topology may be that of FIG. 9.

In FIG. 10, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 9 and 10 show various "units" such as configuration unit 32, and RA unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 11 is a flowchart illustrating an exemplary method implemented in a communication system, such as, for example, the communication system of FIGS. 9 and 10, in accordance with one embodiment. The communication system may include a host computer 24, a network node 16 and a WD 22, which may be those described with reference to FIG. 10. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 12 is a flowchart illustrating an exemplary method implemented in a communication system, such as, for example, the communication system of FIG. 9, in accordance with one embodiment. The communication system may include a host computer 24, a network node 16 and a WD 22, which may be those described with reference to FIGS. 9 and 10. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 13:
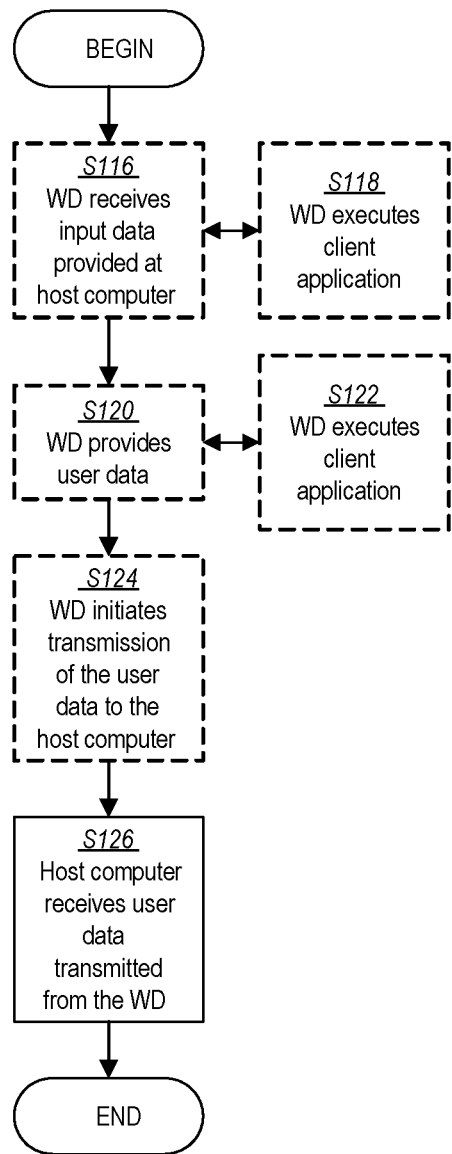
FIG. 13 is a flowchart illustrating exemplary methods implemented in a communication system including a host computer, a network node and a wireless device for receiving user data from the wireless device at a host computer according to some embodiments of the present disclosure.

FIG. 13 is a flowchart illustrating an exemplary method implemented in a communication system, such as, for example, the communication system of FIG. 9, in accordance with one embodiment. The communication system may include a host computer 24, a network node 16 and a WD 22, which may be those described with reference to FIGS. 9 and 10. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 14:
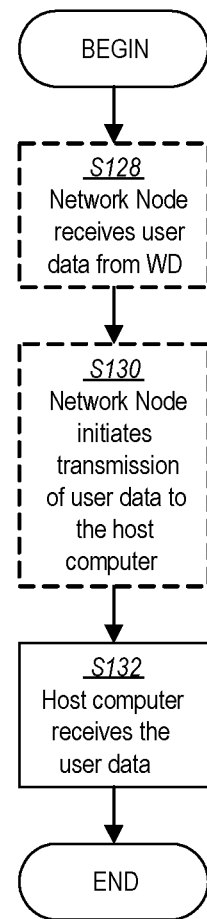
FIG. 14 is a flowchart illustrating exemplary methods implemented in a communication system including a host computer, a network node and a wireless device for receiving user data at a host computer according to some embodiments of the present disclosure.

FIG. 14 is a flowchart illustrating an exemplary method implemented in a communication system, such as, for example, the communication system of FIG. 9, in accordance with one embodiment. The communication system may include a host computer 24, a network node 16 and a WD 22, which may be those described with reference to FIGS. 9 and 10. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 15:
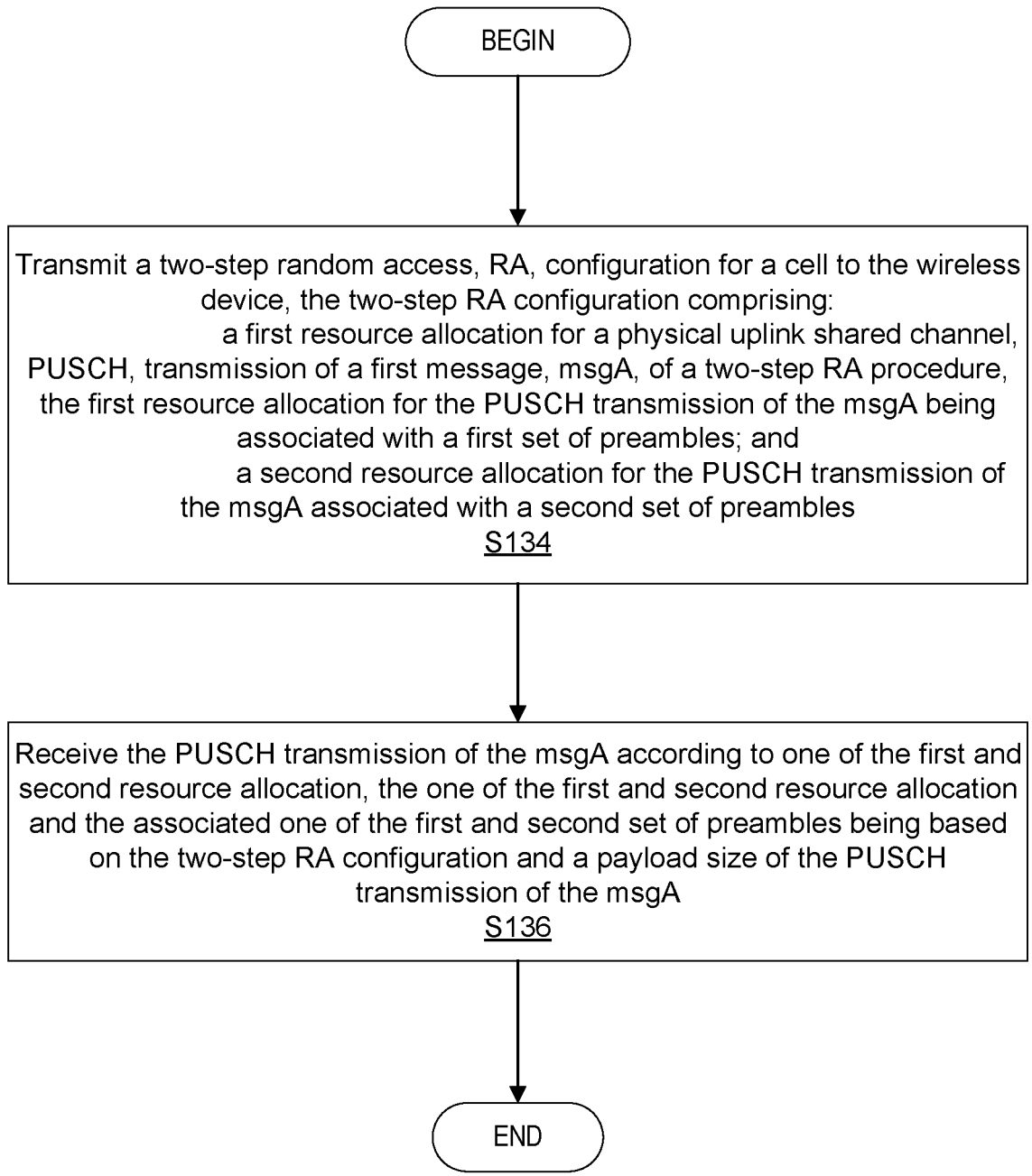
FIG. 15 is a flowchart of an exemplary process in a network node for configuration unit according to some embodiments of the present disclosure.

FIG. 15 is a flowchart of an exemplary process in a network node 16 for 2-step RA configuration according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes transmitting (Block S134), such as by configuration unit 32, processing circuitry 68, processor 70 and/or radio interface 62, a two-step random access, RA, configuration for a cell to the wireless device 22. The two-step RA configuration includes a first resource allocation for a physical uplink shared channel, PUSCH, transmission of a first message, msgA, of a two-step RA procedure, the first resource allocation for the PUSCH transmission of the msgA being associated with a first set of preambles; and a second resource allocation for the PUSCH transmission of the msgA associated with a second set of preambles. The method includes receiving (Block S136), such as by configuration unit 32, processing circuitry 68, processor 70 and/or radio interface 62, the PUSCH transmission of the msgA according to one of the first and second resource allocation, the one of the first and second resource allocation and the associated one of the first and second set of preambles being based on the two-step RA configuration and a payload size of the PUSCH transmission of the msgA.

In some embodiments, the method includes receiving, such as by configuration unit 32, processing circuitry 68, processor 70 and/or radio interface 62, a preamble of the msgA transmission of the two-step RA procedure, the preamble being from the one of the first and second set of preambles that is based on the two-step RA configuration and the payload size of the PUSCH transmission of the msgA. In some embodiments, the two-step RA configuration further comprises a size threshold value associated with the first and second resource allocations of the two-step RA configuration; and receiving the PUSCH transmission of the msgA further includes, such as by configuration unit 32, processing circuitry 68, processor 70 and/or radio interface 62: when the payload size is greater than the size threshold value, receiving the PUSCH transmission of the msgA according to the second resource allocation and associated second set of preambles; and otherwise, receiving the PUSCH transmission of the msgA according to the first resource allocation and associated first set of preambles.

In some embodiments, the two-step RA configuration further comprises a pathloss threshold value associated with the second set of preambles; and receiving the PUSCH transmission of the msgA further includes, such as by configuration unit 32, processing circuitry 68, processor 70 and/or radio interface 62: receiving the PUSCH transmission of the msgA according to the second resource allocation and associated second set of preambles only when an estimated downlink pathloss is less than the pathloss threshold value. In some embodiments, the first and second resource allocation each comprises at least one of: time resources; frequency resources; modulation and coding scheme; transmit power instruction; and redundancy version. In some embodiments, the one of the first and second resource allocation used to receive the PUSCH transmission of the msgA being based also on the respective modulation and coding scheme of the first and second resource allocation.

In some embodiments, the one of the first and second resource allocation used to receive the PUSCH transmission of the msgA being based also on the respective transmit power instruction of the first and second resource allocation. In some embodiments, the two-step RA configuration further comprises a transmit power threshold value associated with the first and second set of preambles; and the one of the first and second resource allocation used to receive the PUSCH transmission of the msgA and the associated one of the first and second set of preambles is based on whether an estimated transmit power meets the transmit power threshold value. In some embodiments, the one of the first and second resource allocation used to receive the PUSCH transmission of the msgA being based also on a logical channel for which the two-step RA procedure is performed.

In some embodiments, the one of the first and second resource allocation used to receive the PUSCH transmission of the msgA being based also on whether the wireless device is an Ultra-reliable Low Latency Communication, URLLC, device. In some embodiments, the PUSCH transmission of the msgA is received, such as by configuration unit 32, processing circuitry 68, processor 70 and/or radio interface 62, according to the two-step RA configuration associated with at least one beam in the cell that is selected by the wireless device. In some embodiments, the two-step RA configuration includes a reference signal received power, RSRP, threshold and the at least one beam in the cell is selected by the wireless device based on the RSRP threshold. In some embodiments, the at least one selected beam includes at least one of: a synchronization signal block, SSB, beam selected out of a plurality of SSB beams in the cell; and a channel state information reference signal, CSI-RS, beam selected out of a plurality of CSI-RS beams in the cell.

In some embodiments, the 2-step RA configuration is comprised in one of: a PUSCH configuration mapped to the selected at least one beam, the PUSCH configuration indicating the first and second resource allocation for the PUSCH transmission of the msgA; a PUSCH configuration and a Physical Random Access Channel, PRACH, configuration, the PRACH configuration being mapped to the selected at least one beam and the PUSCH configuration being mapped to the PRACH configuration that is associated with the selected at least one beam; and a PUSCH configuration and a Physical Random Access Channel, PRACH, configuration, the PRACH configuration being mapped to the selected at least one beam and the PUSCH configuration being based on a logical channel for which the two-step RA procedure is performed.

In some embodiments, the selected at least one beam is mapped to a plurality of frequency-multiplexed Random Access Channel, RACH, occasions in one time resource. In some embodiments, a size of the first resource allocation for the PUSCH transmission of the msgA is different from a size of the second resource allocation for the PUSCH transmission of the msgA. In some embodiments, the two-step RA configuration is transmitted in system information. In some embodiments, the two-step RA configuration indicates, for each of the first and second resource allocation for the PUSCH transmission of the msgA, at least one of a modulation and coding scheme, a number of orthogonal frequency division multiplexing, OFDM, symbols, and a number of physical resource blocks.

In some embodiments, the method includes configuring, such as via configuration unit 32, processing circuitry 68, processor 70 and/or radio interface 62, the WD 22 with at least one two-step random access (RA) configuration. The method includes receiving, such as via configuration unit 32, processing circuitry 68, processor 70 and/or radio interface 62, a preamble and/or a msgA PUSCH, the preamble and/or the msgA PUSCH resource based at least in part on the at least one two-step RA configuration.

In some embodiments, the preamble and/or the msgA PUSCH resource is further based at least in part on a two-step RA configuration associated with a WD-selected beam. In some embodiments, the preamble and/or the msgA PUSCH resource is further based at least in part on a payload size for the msgA PUSCH.

Figure 16:
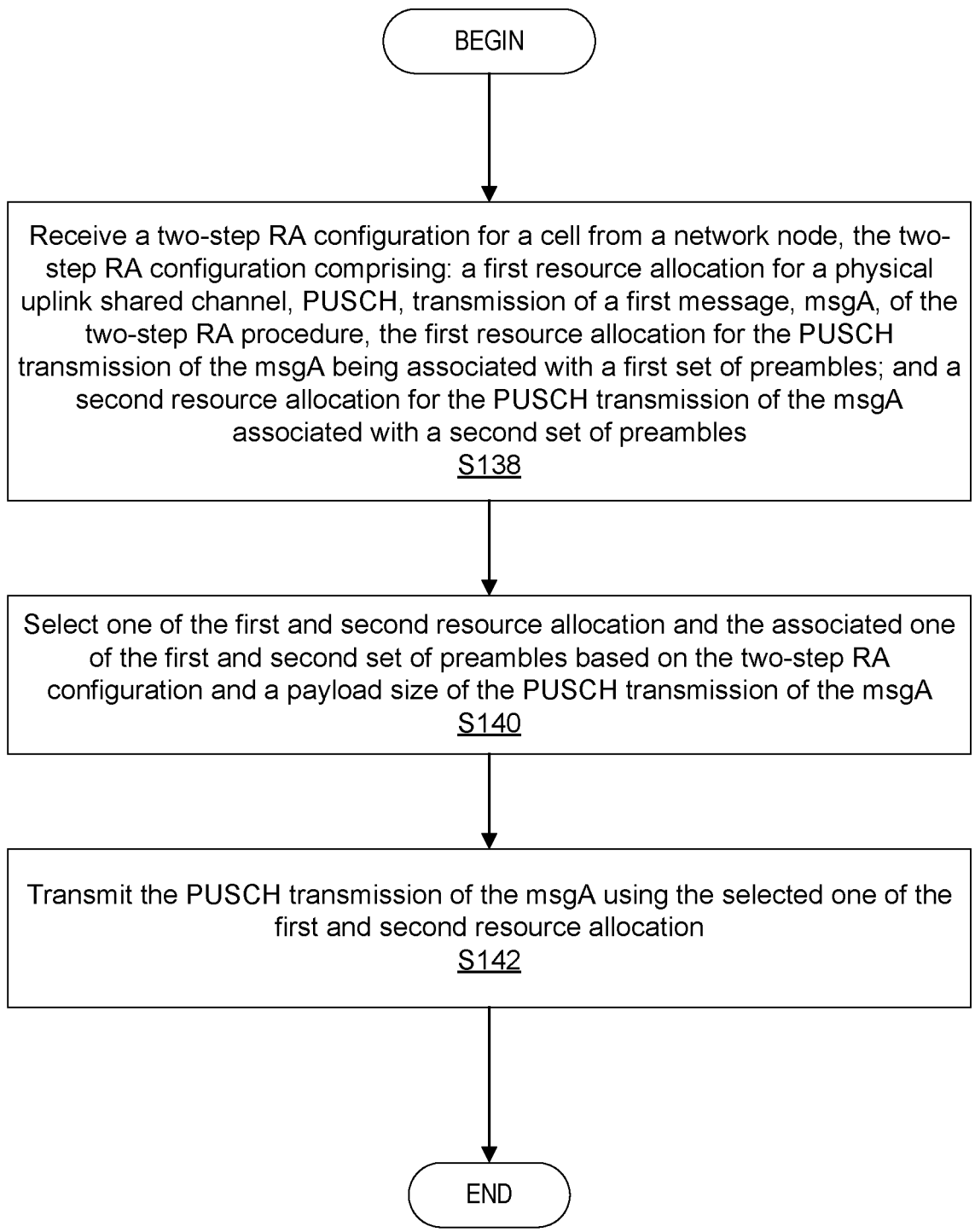
FIG. 16 is a flowchart of an exemplary process in a wireless device for RA unit according to some embodiments of the present disclosure.

FIG. 16 is a flowchart of an exemplary process in a wireless device 22 for 2-step RA according to some embodiments of the present disclosure. One or more Blocks and/or functions and/or methods performed by WD 22 may be performed by one or more elements of WD 22 such as by RA unit 34 in processing circuitry 84, processor 86, radio interface 82, etc. The example method implemented in a wireless device for selecting resources for a two-step random access, RA, procedure includes receiving (Block S138), such as by RA unit 34, processing circuitry 84, processor 86 and/or radio interface 82, a two-step RA configuration for a cell from a network node, the two-step RA configuration comprising: a first resource allocation for a physical uplink shared channel, PUSCH, transmission of a first message, msgA, of the two-step RA procedure, the first resource allocation for the PUSCH transmission of the msgA being associated with a first set of preambles; and a second resource allocation for the PUSCH transmission of the msgA associated with a second set of preambles. The method includes selecting (Block S140), such as by RA unit 34, processing circuitry 84, processor 86 and/or radio interface 82, one of the first and second resource allocation and the associated one of the first and second set of preambles based on the two-step RA configuration and a payload size of the PUSCH transmission of the msgA. The method includes transmitting (Block S142), such as by RA unit 34, processing circuitry 84, processor 86 and/or radio interface 82, the PUSCH transmission of the msgA using the selected one of the first and second resource allocation.

In some embodiments, the method further includes selecting, such as by RA unit 34, processing circuitry 84, processor 86 and/or radio interface 82, a preamble for the msgA transmission of the two-step RA procedure from the selected one of the first and second set of preambles; and transmitting, such as by RA unit 34, processing circuitry 84, processor 86 and/or radio interface 82, the selected preamble of the msgA. In some embodiments, selecting one of the first and second resource allocation and associated one of the first and second set of preambles includes comparing, such as by RA unit 34, processing circuitry 84, processor 86 and/or radio interface 82, the payload size of the PUSCH transmission of the msgA with a size threshold value associated with the first and second resource allocations of the two-step RA configuration; selecting, such as by RA unit 34, processing circuitry 84, processor 86 and/or radio interface 82, the second resource allocation and associated second set of preambles when the payload size is greater than the size threshold value; and selecting, such as by RA unit 34, processing circuitry 84, processor 86 and/or radio interface 82, the first resource allocation and associated first set of preambles otherwise.

In some embodiments, the two-step RA configuration further comprises a pathloss threshold value associated with the second set of preambles, and selecting one of the first and second resource allocation and the associated one of the first and second set of preambles further includes comparing, such as by RA unit 34, processing circuitry 84, processor 86 and/or radio interface 82, an estimated downlink pathloss with the pathloss threshold value associated with the second set of preambles; and selecting, such as by RA unit 34, processing circuitry 84, processor 86 and/or radio interface 82, the second resource allocation and associated second set of preambles only when the estimated downlink pathloss is less than the pathloss threshold value. In some embodiments, the first and second resource allocation each comprises at least one of: time resources; frequency resources; modulation and coding scheme; transmit power instruction; and redundancy version. In some embodiments, selecting one of the first and second resource allocation is based also on the respective modulation and coding scheme of the first and second resource allocation. In some embodiments, selecting one of the first and second resource allocation is based also on the respective transmit power instruction of the first and second resource allocation.

In some embodiments, the two-step RA configuration further comprises a transmit power threshold value associated with the first and second set of preambles and selecting one of the first and second resource allocation and associated one of the first and second set of preambles comprises: estimating, such as by RA unit 34, processing circuitry 84, processor 86 and/or radio interface 82, a transmit power to transmit the PUSCH transmission of the msgA on the one of the first and second resource allocation; and selecting, such as by RA unit 34, processing circuitry 84, processor 86 and/or radio interface 82, the one of the first and second resource allocation based on whether the estimated transmit power meets the transmit power threshold value. In some embodiments, selecting the one of the first and second resource allocation and the associated one of the first and second set of preambles is based also on a logical channel for which the two-step RA procedure is performed. In some embodiments, selecting one of the first and second resource allocation is based also on whether the wireless device is an Ultra-reliable Low Latency Communication, URLLC, device.

In some embodiments, the method further includes selecting, such as by RA unit 34, processing circuitry 84, processor 86 and/or radio interface 82, at least one beam from among a plurality of beams in the cell; determining, such as by RA unit 34, processing circuitry 84, processor 86 and/or radio interface 82, that the selected beam is associated with the two-step RA configuration; and using, such as by RA unit 34, processing circuitry 84, processor 86 and/or radio interface 82, the two-step RA configuration that is associated with the selected beam to select the one of the first and second resource allocation and the associated one of the first and second set of preambles. In some embodiments, selecting the at least one beam further comprises selecting, such as by RA unit 34, processing circuitry 84, processor 86 and/or radio interface 82, the at least one beam from among the plurality of beams in the cell based on a reference signal received power, RSRP, threshold. In some embodiments, the at least one selected beam includes at least one of: a synchronization signal block, SSB, beam selected out of a plurality of SSB beams in the cell; and a channel state information reference signal, CSI-RS, beam selected out of a plurality of CSI-RS beams in the cell.

In some embodiments, the 2-step RA configuration is comprised in one of: a PUSCH configuration mapped to the selected at least one beam, the PUSCH configuration indicating the first and second resource allocation for the PUSCH transmission of the msgA; a PUSCH configuration and a Physical Random Access Channel, PRACH, configuration, the PRACH configuration being mapped to the selected at least one beam and the PUSCH configuration being mapped to the PRACH configuration that is associated with the selected at least one beam; and a PUSCH configuration and a Physical Random Access Channel, PRACH, configuration, the PRACH configuration being mapped to the selected at least one beam and the PUSCH configuration being based on a logical channel for which the two-step RA procedure is performed.

In some embodiments, the selected at least one beam is mapped to a plurality of frequency-multiplexed Random Access Channel, RACH, occasions in one time resource. In some embodiments, a size of the first resource allocation for the PUSCH transmission of the msgA is different from a size of the second resource allocation for the PUSCH transmission of the msgA. In some embodiments, the two-step RA configuration is received in system information. In some embodiments, the method further includes determining, such as by RA unit 34, processing circuitry 84, processor 86 and/or radio interface 82, a set of information bits for the PUSCH transmission of the msgA, the set of information bits corresponding to the payload; determining, such as by RA unit 34, processing circuitry 84, processor 86 and/or radio interface 82, a transport block size according to at least one of a modulation and coding scheme, a number of orthogonal frequency division multiplexing, OFDM, symbols, and a number of physical resource blocks indicated in the one of the first and second resource allocation in the two-step RA configuration; when the set of information bits is less than or equal to the transport block size, transmitting the PUSCH transmission of the msgA including the information bits; and when the set of information bits is greater than the transport block size, removing, such as by RA unit 34, processing circuitry 84, processor 86 and/or radio interface 82, at least one bit in the set of information bits based on a priority of a logical channel for which the two-step RA procedure is performed.

In some embodiments, the method includes obtaining, such as via RA unit 34, processing circuitry 84, processor 86 and/or radio interface 82, at least one two-step random access (RA) configuration. The method includes selecting, such as via RA unit 34, processing circuitry 84, processor 86 and/or radio interface 82, a preamble and/or a msgA PUSCH resource based at least in part on the at least one two-step RA configuration.

In some embodiments, the method further includes selecting, such as via RA unit 34, processing circuitry 84, processor 86 and/or radio interface 82, a beam, the selection of the preamble and/or the msgA PUSCH resource based at least in part on a two-step RA configuration associated with the selected beam. In some embodiments, the selection of the preamble and/or the msgA PUSCH resource based at least in part on a payload size for the msgA PUSCH.

Having described the general process flow of arrangements of the disclosure and having provided examples of hardware and software arrangements for implementing the processes and functions of the disclosure, the sections below provide details and examples of arrangements for PUSCH resource selection in 2-step random access (RA), which may be implemented by the network node 16, wireless device 22 and/or host computer 24.

Some embodiments are discussed in more detail herein below.

Basic Observations

It is noted that 2-step RA may involve an UL PUSCH transmission (MsgAPUSCH) which might have a higher risk of failing than the average UL PUSCH transmission, because of the lack of tailored link adaptation. This risk may be mitigated by configuring excessively robust MCS (and possibly using extra high transmit power) for the MsgA transmission on the PUSCH (i.e., MsgAPUSCH) as compared with other solutions, but that may come at the cost of increased transmission resource usage and waste. Hence, a 2-step RA may be most beneficial when the channel quality is comparatively high.

Some Solution Principles

To improve the transmission resource usage in conjunction with 2-step RA configurations/procedures, a tailored differentiation between and selective use of possible PUSCH resource allocation(s) (e.g., with different sizes), which improve the overall resource and procedure efficiency is proposed. As an example, a possible basis for division and selective use of differentiated 2-step RA PUSCH resources is supporting and not supporting handling of ultra-reliable low latency communication (URLLC) WDs 22 (i.e., WDs 22 running URLLC applications and/or have ULRLLC-like requirements). One scenario in this disclosure is to have different resource allocations depending on the msgA PUSCH size (i.e., a payload size of the PUSCH transmission of the msgA), considering also coverage and logical channel. As an example, a WD 22 in good coverage can successfully transmit a large MsgAPUSCH including RRC as well as user data while a WD 22 in bad coverage may only transmit a small MsgAPUSCH on the same PUSCH resource size. When selecting the transmission resource (out of the allocated ones) for transmission of MsgAPUSCH, the WD 22 may compare the (minimum) MsgAPUSCH size and the pathloss versus one or several thresholds associated with the PUSCH resource allocations to determine the suitable preamble and PUSCH resources. The selection could also be performed conditionally on which logical channel the Random access is performed for. The selection could also consider other aspects such as whether the random access is for URLLC WDs 22, in which case the PUSCH resources optimized for URLLC transmissions are selected, e.g., a larger allocation enabling a more robust transmission.

WD Details

Some embodiments of the present disclosure include a method at a WD 22 for performing random access. In some embodiments, the method may include one or more of the following:

Obtaining random-access configuration(s) for a cell (e.g., provided by network node 16); for example, for a serving cell the WD 22 is camping on (in RRC_IDLE or RRC_INACTIVE state) or for a target cell (in conjunction with handover), the RA configuration(s) comprising a 2-step random access (RA) configuration per beam or groups of beams in the cell (where a group of beams constitute a subset of the beams in the cell) or a 2-step RA configuration applicable to all the beam(s) in the cell (where one or more beams may be used to transmit the concerned reference signal in the cell). Associating the same 2-step RA configuration with all the beam(s) in the cell may be useful when a single SSB is used to cover the cell. The reference signal being transmitted in the beams may be of the SSB or CSI-RS type;

The configurations described above may be provided during the configuration of a handover, Dual Connectivity procedures (e.g. SCG addition, SCG change), Carrier Aggregation procedures (e.g. SCell setup, SCell addition, SCell activation, etc.);

The configurations described above may be provided in system information, where the WD 22 obtains the configuration when the WD camps on the cell and may possibly access the cell.

Configurations may be mapped to beams directly or indirectly. For example, there may be a relation between a selected beam and a PRACH configuration, then a relation between PRACH configuration and a 2-step RA configuration.

Configurations may be provided per reference signal (RS) type e.g., there may be a 2-step RA configuration associated with each (or each subset) of a set of SSBs and/or a 2-step RA configuration associated with each (or each subset) of a set of CSI-RSs.

The beam-dependent 2-step RA configuration may be encoded in RRC (ASN.1) and may differ and depending on the solutions the WD 22 obtains the 2-step RA configuration (e.g., mapping to PUSCH resources and their selection) in different IEs.

In one alternative, the WD 22 obtains 2-step RA configuration as part of the IE RACH-Config-Common.

In one alternative, the WD 22 obtains 2-step RA configuration as part of the IE RACH-ConfigDedicated.

In one alternative, the WD 22 obtains 2-step RA configuration as part of the IE RACH-ConfigGeneric.

In one alternative, the WD 22 obtains 2-step RA configuration in multiple different IEs, where different parameters are provided in each of them, e.g. as part of the IE RACH-ConfigGeneric and RACH-ConfigCommon, and possibly including a new IE to make a clear distinction of what is a 2-step RA configuration or 4-step RA configuration.

In one alternative, the WD 22 obtains 2-step RA configuration in a new IE, different from the ones above.

When all SSBs are mapped to a set of RACH occasions in one SSB-to-preamble association period, the group of beams may be considered a complete set of SSBs transmitted in this cell.

Each beam may be referred to as a CSI-RS beam or SSB beam. Each SSB beam may be mapped to one or multiple RACH occasions, e.g., when multiple frequency-multiplexed ROs in one time instance are mapped to one SSB beam.

Triggering random access (e.g., upon request from upper layers);

For example, when RRC submits a message to lower layers and reaches the MAC layer towards a target cell the WD 22 is not synchronized with, such as in the case the WD 22 receives a handover command (in the form of an RRCReconfiguration message with a reconfiguration with sync IE) and should send a handover complete message (i.e., an RRCReconfigurationComplete message) in a target cell.

RA may be triggered by any other procedure relying on random access e.g., the detection of Beam Failure Recovery where the WD 22 detects beam failure and is to select a beam among a list of candidate beams, where each of these may have a 2-step RA configuration.

Another situation that may trigger random access is when UL data appears in the WD 22 (e.g., created by an application in the WD 22). This will trigger random access if the WD 22 is in RRC_IDLE or RRC_INACTIVE state and needs to transit to RRC_CONNECTED state before the WD 22 can transmit the pending UL data. Pending UL data in a WD 22 in RRC_CONNECTED state may also trigger random access, if the WD 22 lacks a valid timing advance and needs to acquire a valid timing advance before the WD 22 can transmit the pending UL data.

Yet another situation where random access may be triggered is if the WD 22 is paged and needs to transit to RRC_CONNECTED state to respond to the page.

Yet another situation when random access may be triggered is if the WD 22 receives a physical downlink control channel (PDCCH) order/instruction to perform random access to acquire a valid timing advance. This may happen if, for example, the network node 16 receives DL data for a WD 22 in RRC_CONNECTED state which lacks a valid timing advance. The network node 16 will then order/instruct the WD 22 to acquire a valid timing advance before the DL data is transmitted to the WD 22, so that the WD 22 can transmit a hybrid automatic repeat request (HARQ) feedback in the UL.

Performing beam selection;

In one embodiment, performing beam selection may include, for example, performing an SSB selection e.g., based on radio conditions, where the WD 22 selects the SSB with highest RSRP among the detected ones for the serving cell or target cell. The cell in which the WD 22, such as for example via processing circuitry 84, performs SSB selection may be the serving cell during transition from RRC_IDLE or RRC_INACTIVE state to RRC_CONNECTED state or when a WD 22 in RRC_CONNECTED state re-acquires a valid timing advance, or the cell may be a target cell, or potential target cell, in conjunction with handover. In conjunction with handover, the beam selection may include selection of CSI-RS beam in the target cell.

In some embodiments, this may be considered similar to what is called in MAC specifications "Random Access Resource selection", where the selected beam (e.g. selected SSB) maps to a resource to transmit the preamble (however, in the case of 2-step RA, the selected beam may also map to resources for transmission of $MsgA_{PUSCH}$ on PUSCH).

Determining whether the selected beam (e.g., selected SSB) has an associated 2-step RACH configuration;

In some embodiments, this step may be implemented by the WD 22, such as for example via processing circuitry 84, checking the presence of a random-access configuration for the selected SSB or CSI-RS, i.e., the presence of a 2-step random-access configuration indicates that there is a mapping between the selected beam (e.g., SSB) and a 2-step random-access configuration.

In some embodiments, the 2-step RA configuration in this context may include a mapping between the selected beam and a PUSCH configuration (e.g., an indication of PUSCH transmission resources for transmission of MsgAPUSCH).

In some embodiments, the 2-step RA configuration in this context may be a mapping between the PRACH configuration associated with the selected beam and a PUSCH configuration (for transmission of $MsgA_{PUSCH}$). Compared to the case above, this is an indirect mapping via the PRACH mapping.

In some embodiments, the 2-step RA configuration in this context may be a mapping between the PRACH configuration associated with the selected beam and a PUSCH configuration (for transmission of $MsgA_{PUSCH}$) that includes a logical channel (LCH) mapping for which the $MsgA_{PUSCH}$ reliability, e.g., in terms of MCS, PUSCH duration, etc., is met for URLLC data mapped to this LCH.

If a subset of the concerned RS beams, e.g., SSBs, have associated 2-step RA configurations, then the WD 22 may determine whether a certain selected beam is one of the beams with an associated 2-step RA configuration. Otherwise, if all or none of the concerned RS beams, e.g., SSB(s), have associated 2-step RA configurations, then the WD 22 determination can be done e.g., a priori, simply by acquiring the RA configuration, e.g., in SIB1 in the system information. That is, in those cases, the WD 22 may not have to determine if a certain selected beam is one of the beams that have associated 2-step RA configurations.

If the selected beam (e.g., selected SSB) has an associated 2-step RACH configuration, the WD 22, possibly subject to fulfillment of possible conditions, e.g., in terms of estimated path loss, initiates a 2-step RA procedure using that associated configuration. The configuration in this context may include a mapping between the selected beam and a PUSCH configuration (for transmission of MsgAPUSCH).

In some embodiments, the association between SSB and msgA preamble and between SSB and $MsgA_{PUSCH}$ configuration may depend on the beam relationship between preamble transmission and the PUSCH transmission for one msgA.

In some embodiments, if the same beam corresponding to an SSB beam is required to be applied to the msgA preamble transmission and $MsgA_{PUSCH}$ transmission, the SSB selected determines a pair of msgA preamble and msgA PUSCH associated with the same beam corresponding to this SSB. In this case, the determined preamble indirectly determines the PUSCH resource via the mapping between preamble and PUSCH.

In some embodiments, if different beams corresponding to different SSBs can be applied respectively to the msgA preamble transmission and msgA PUSCH transmission, a set of SSBs that meet the link quality requirements may be used for determining the beam transmission of msgA preamble and msgA PUSCH. The link quality requirement for preamble and PUSCH may also be different.

In some embodiments, one aspects of this disclosure for the 2-step RA configuration is how the selected beam (e.g., SSB-x or CSI-RS-x) maps to a PRACH resource and to a PUSCH resource for the transmission of MsgA (i.e., PRACH preamble+$MsgA_{PUSCH}$). The PUSCH resource selection for transmitting a $MsgA_{PUSCH}$ may depend on the message size and/or resulting transmission power in relation to a selected preamble or on the estimated pathloss. In some embodiments, for the preamble transmission in a random access procedure, the transmission power, or transmit power, to use is determined (e.g., by WD 22, such as for example via processing circuitry 84) using a formula which takes the estimated downlink pathloss as input data. The WD 22, such as for example via processing circuitry 84, may estimate the downlink pathloss by comparing the received signal power with the downlink transmit power which is indicated in the system information. The preamble transmit power is configured by the preambleReceivedTargetPower parameter in the RACH-ConfigGeneric IE.

In the 4-step RACH configuration in the Rel-15 RRC TS 38.331, version 15.6.0 a PRACH configuration index (prach-ConfigurationIndex) defines what time and frequency domain resources are used for PRACH transmissions, and in RACH-ConfigCommon a threshold message size (ra-Msg3SizeGroupA) is defined for preamble group (i.e., a payload size of the PUSCH transmission of the msgA) (or size range), where the use of the preamble groups is conditioned by a msgA size threshold. For this example, the following can be specified in the RRC specification 3GPP TS 38.331, version 15.6.0 as an example:

If MsgAGroupB is not configured, MsgAGroupA is always used.

If both MsgAGroupA and MsgAGroupB are configured, a threshold value, e.g., ra-MsgASizeGroupA, can be defined to determine which group to use, if msgA PUSCH size is less than the threshold, group A is used, otherwise group B is used. A "messageAPowerOffsetGroupB" can also be included as a threshold for preamble selection, and a "numberOfRA-MsgAPreamblesGroupA" is included to determine the number of contention-based preambles in group A, the remaining contention-based preambles are then in group B.

The following can be included in the RACH-ConfigCommon IE:

```
MsgAgroupBconfigured                       SEQUENCE {
    ra-MsgASizeGroupA                      ENUMERATED {b56, b144, b208, b256,
b282, b480, b640,
                                           b800, b1000, b72, spare6, spare5,spare4,
spare3, spare2, spare1},
    messageAPowerOffsetGroupB              ENUMERATED { minusinfinity,
dB0, dB5, dB8, dB10, dB12, dB15, dB18},
    numberOfRA-MsgAPreamblesGroupA         INTEGER (1..64)
}
``` resource selection if such is included for the cell. In some embodiments herein, similar thresholds are defined for the 2-step RA procedure.

In some embodiments, a size threshold value may be defined for the 2-step RA procedure. For example, the WD 22 may select one of a first and second resource allocation and associated one of the first and second set of preambles by, for example, comparing the msgA PUSCH size (i.e., payload size of the PUSCH transmission of the msgA) with the size threshold value associated with the first and second resource allocations of the two-step RA configuration, selecting the second resource allocation and associated second set of preambles when the payload size is greater than the size threshold value, and selecting the first resource allocation and associated first set of preambles otherwise.

To illustrate how the standard specifications (in particular the RRC specification 3GPP TS 38.331, version 15.6.0) could be modified to support such selection and the MsgA-$_{PUSCH}$ size-dependent preamble and PUSCH allocation selection, an example is disclosed herein where two preamble groups, e.g., MsgAGroupA and MsgAGroupB, are introduced for 2-step RA. Each preamble group may be associated with (or be suitable for) a different msgA size In some embodiments, the grouping of preambles may be related to the relationship between 2-step RO and 4-step RO, as described in more detail below.

When 2-step RO and 4-step RO are separately configured, then the preamble configuration and allocation for 2-step RA can be configured separately, the preamble grouping can be defined for 2-step RA independently from the preamble grouping for 4-step RA.

When 2-step RO and 4-step RO are shared, the 2-step RA preamble grouping can be mixed with 4-step RO grouping in order to further split preambles for 2-step RA from the preambles previously configured for 4-step RA. At least 2 examples are provided below for this case.

In one example, a group A configuration is used in addition to the existing groupBconfigured for the msg1 contention-based preamble group B configuration. The numberOfRA-PreamblesGroupA_4step parameter is defined to determine the number of 4-step preambles in group A, and the remaining preambles in group A is used for 2-step RA, which can be further divided into two groups (MsgAGroupA and MsgAGroupB) based on the MsgAgroupBconfigured if configured.

An ASN.1 code example of this could be as follows.

```
numberOfRA-PreamblesGroupA_4step          INTEGER (1..64)
MsgAgroupBconfigured                       SEQUENCE {
    ra-MsgASizeGroupA                      ENUMERATED {b56, b144, b208, b256,
b282, b480, b640,
                                           b800, b1000, b72, spare6, spare5,spare4,
spare3, spare2, spare1},
    messageAPowerOffsetGroupB              ENUMERATED { minusinfinity, dB0,
dB5, dB8, dB10, dB12, dB15, dB18},
    numberOfRA-MsgAPreamblesGroupA         INTEGER (1..64)
}
groupBconfigured                           SEQUENCE {
    ra-MsgSizeGroupA                       ENUMERATED {b56, b144, b208, b256,
```

```
b282, b480, b640,
                                        b800, b1000, b72, spare6, spare5,spare4,
spare3, spare2, spare1},
    messagePowerOffsetGroupB            ENUMERATED { minusinfinity, dB0,
dB5, dB8, dB10, dB12, dB15, dB18},
    numberOfRA-PreamblesGroupA          INTEGER (1..64)
}
```

Note: to be consistent, the following relations may be valid for the parameters in the ASN.1 code example above:

numberOfRA-
    PreamblesGroupA_4step<numberOfRA-Pre-
    amblesGroupA and numberOfRA-
    MsgAPreamblesGroupA<numberOfRA-Pre-
    amblesGroupA−numberOfRA-
    PreamblesGroupA_4step.]

In another example, a total number of preambles used for 2-step RA is defined by "numberOfRA-Preambles_2step", which comprises preambles for both 2-step group A and 2-step group B if configured. The 2-step group B preambles are derived from the total number of group B preambles for both 2-step RA and 4-step RA.

numberOfRA-Preambles_2step INTEGER (1 . . . 64)

```
    groupBconfigured                    SEQUENCE {
        ra-MsgSizeGroupA                ENUMERATED {b56, b144, b208, b256, b282,
b480, b640,
                                        b800, b1000, b72, spare6, spare5,spare4, spare3,
spare2, spare1},
        messagePowerOffsetGroupB        ENUMERATED { minusinfinity, dB0, dB5,
dB8, dB10, dB12, dB15, dB18},
        numberOfRA-PreamblesGroupA      INTEGER (1..64)
        ra-MsgASizeGroupA               ENUMERATED {b56, b144, b208, b256, b282,
b480, b640,
                                        b800, b1000, b72, spare6, spare5,spare4, spare3,
spare2, spare1},
        messageAPowerOffsetGroupB       ENUMERATED { minusinfinity, dB0, dB5,
dB8, dB10, dB12, dB15, dB18},
        numberOfRA-MsgAPreamblesGroupA  INTEGER (1..64)
}
```

Note: to be consistent, the following relations must be valid for the parameters in the ASN.1 code example above:

numberOfRA-
    MsgAPreamblesGroupA<numberOfRA-
    Preambles_2step, numberOfRA-
    MsgAPreamblesGroupA<numberOfRA-Pre-
    amblesGroupA and numberOfRA-Preambles_2step−numberOfRA-
    MsgAPreamblesGroupA<totalNumberOfRA-
    Preambles−numberOfRA-PreamblesGroupA.

In some embodiments, determining the set of preambles and PUSCH resources for MsgA (preamble+MsgA$_{PUSCH}$) transmission for the initiated RA procedure, can be performed in one or more of the following ways:

As one embodiment, the preamble and PUSCH resources for the transmission of MsgA$_{PUSCH}$ depends on the message size as given by the 2-step RA configuration where one or several thresholds are given (msgA_size_1, msgA_size_2, . . . , msgA-size_n). If the msgA size is <msgA_size_1, then preambles from preamble_group_0 is used, and if the msgA size is >=msgA_size_k and <msgA_size_k+1 (i.e., msgA_size_k≤msgA size<msgA_size_k+1) then preamble_group_k is used (e.g., by WD 22). With this principle, in some embodiments, there is one less threshold than the number of preamble groups and one of the preamble groups is dedicated for the case where the highest threshold is exceeded. Note that a preamble group (and corresponding PUSCH resources) may include only one single preamble (and PUSCH resource). These thresholds may be given in the 2-step RACH configuration in the RRC specification (e.g., transmitted by network node 16). If only 2 groups are defined, as one option, the threshold value can reuse the threshold configured for 4-step RA, i.e., the ra-Msg3SizeGroupA. In some embodiments, the number of groups can be either configured by a higher layer (e.g., RRC) or the number of groups can be a fixed value. In some embodiments, the number of groups can be the same as the number message sizes supported (e.g., the number of PUSCH resource allocation sizes). In some embodiments, the number of groups can be less than the number of supported message sizes, in which case each preamble group corresponds to one or more message size(s).

In some embodiments, a pathloss threshold value may be defined for 2-step RA. For example, the configuration (e.g., 2-step RA configuration) may also include a pathloss threshold value associated with a set of preambles. The WD 22 may select a resource allocation and associated set of preambles based at least in part on the pathloss threshold value. For example, the 2-step RA configuration may include the pathloss threshold/threshold value (per preamble group), and a specific preamble group (corresponding to a msgAsize, i.e., a payload size of the PUSCH transmission of the msgA) may only be selected if the pathloss (e.g., estimated downlink pathloss) is less than the pathloss threshold value for the preamble group. That is, selection of a certain preamble group may require that the msgA size fulfills a msgA size requirement and/or the pathloss meets a pathloss requirement associated with the preamble group. For example, the WD 22 may compare an estimated downlink pathloss with the pathloss threshold value associated with a set of preambles and select the resource allocation and associated set of preambles only if/when the estimated downlink pathloss is less than the pathloss threshold value.

Assumedly, the pathloss requirement is stricter (i.e., lesser pathloss), the larger the message size. As one possible embodiment, if the msgA size matches preamble_group_k (e.g., msgA_size_k≤msgA size<msgA_size_k+1 or, if msgA_size_k is the highest threshold, msgA size≤msgA_size_k), but the pathloss does not meet the corresponding pathloss requirement (e.g., the pathloss is too high) for that preamble group, then the WD 22, such as for example via processing circuitry 84, checks/determines if the pathloss is low enough for the preamble group associated with one step smaller msgA size. If that check/determination is unsuccessful, the WD 22 tries the preamble group associated with one more step smaller msgA size, and so on, etc. Preferably, in some embodiments, there is no pathloss requirement associated with the preamble group associated with the smallest msgA size.

Possible alternatives to pathloss requirements, e.g., that the pathloss must be lower than a threshold in order for a WD 22 to select a certain preamble group, could be to use other measures related to the signal strength or signal quality, such as reference signal received power (RSRP), reference signal received quality (RSRQ), reference signal strength indicator (RSSI), signal-to-noise ratio (SNR) or signal-to-interference-plus-noise ratio (SINR). If RSRP thresholds are used, the requirement may be that the RSRP must exceed a certain threshold in order for the WD 22 to be allowed to select the corresponding preamble group.

In some embodiments, the thresholds may be ignored in case the random access is performed for a specific logical channel, e.g., CCCH.

In some embodiments, the thresholds may be specific per beam, e.g., associated per SSB or per CSI-RS.

In some embodiments, a PRACH configuration index defines what time and frequency domain resources are to be used for PRACH transmissions and for where, or in a related configuration element, a threshold message size and/or transmitted power level is configured, such as, one or more of:

Transmitting (e.g., by WD 22, such as for example via processing circuitry 84 and/or radio interface 82) MsgA using a certain preamble and the associated PUSCH resource as determined by the message payload size (e.g., MAC service data unit (SDU) payload size)

Alternatively, or additionally, included in the 2-step RA configuration, the PUSCH resource selection is based on threshold estimated transmit power corresponding to transmitting MsgA$_{PUSCH}$ on a selected PUSCH time and frequency domain resource mapped to the selected preamble resource.

As another embodiment, if the PUSCH resource selection associated preamble does not depend on the message size as, e.g., given by the 2-step RA configuration (e.g., no threshold message size or transmission power is configured for the procedure in MsgA$_{PUSCH}$ resource selection), the WD 22, such as for example via processing circuitry 84, may select any preamble and PUSCH resource, possibly based on WD 22 implementation specific estimates of the suitability of available PUSCH resource allocations in relation to the size of the MsgA$_{PUSCH}$ message and/or the current radio channel conditions (e.g., in terms of pathloss, RSRP, RSRQ, RSSI, SNR or SINR).

For the further elaboration of possible embodiments of methods for selection of a preamble or a preamble group with associated PUSCH resource allocation among a plurality of preambles or preamble groups with associated PUSCH resource allocations of different sizes, the present disclosure provides that, as an example, two groups of preambles can be configured for 2-step RA, e.g., denoted MsgAGroupA and MsgAGroupB, where each preamble group corresponds to a different PUSCH resource allocation size. For example, similar to 4-step RA, a size-related threshold can be associated with the preamble groups for 2-step RA to guide the WD's 22 selection of preamble group.

However, in this context, a difference between 4-step RA and 2-step RA is that in 4-step RA the UL grant for transmission of Msg3 is given in Msg2 (RAR) and thus not known to the WD 22 at the time of the preamble group selection. Hence, the Msg3 size threshold is needed, so that the preamble group becomes a coarse indication of the size of Msg3, so that the network node 16 (e.g., gNB) can base the PUSCH resource allocation size on this information. In addition, in the 4-step RA, since the WD 22, at the time of preamble group selection, does not know the MCS for Msg3 (and not the number of PRBs that will be allocated), the threshold for preamble group selection has to be expressed in terms of Msg3 message size, i.e., in terms of information bits.

In 2-step RA, on the other hand, the WD 22 is typically provided a PUSCH occasion configuration via higher layer signaling (e.g., RRC), and therefore knows the resource allocation for MsgA$_{PUSCH}$ in terms of number of physical resource blocks (PRBs), number of orthogonal frequency division multiplexing (OFDM) symbols, and/or the MCS to use (unless the MCS can be dynamically selected by the WD 22). Hence, the WD 22 can calculate from the number of PRBs and/or OFDM symbols in the PUSCH occasion configuration and the MCS to be applied, and thereby derive the maximum message size (in terms of information bits), that can fit in the PUSCH resource allocations associated with the respective preamble groups. Hence, in 2-step RA, no MsgA$_{PUSCH}$ size threshold has to be explicitly configured/signaled to the WD 22, since the WD 22, such as for example via processing circuitry 84, can determine which preamble group is suitable for a certain MsgA$_{PUSCH}$ message size. Hence, methods for selection of PUSCH resource allocation and associated preamble or preamble group may be implemented in a WD 22 (e.g., using the principles described above), where the only information required from the network node 16 would be the 2-step RA configuration providing the PUSCH resource allocations (including time/frequency resources and possibly demodulation reference signal (DMRS sequences) and/or DMRS port configurations as well as MCSs), the available preambles and their respective associations with PUSCH resource allocations. Note that optionally the network node 16 could still configure transmit power instructions (e.g., in relation to the estimated downlink pathloss) associated with different PUSCH resource allocations (and thus with the preamble(s) or preamble group(s) associated with the PUSCH resources allocations).

One method to determine the maximum message size that can be carried in a PUSCH occasion is to use the transport block size determination in, e.g., 3GPP TS 38.214, section 6.4.1.2, version 15.6.0, calculating according to a modulation and coding state, a number of OFDM symbols, and a number of physical resource blocks to be used in transmissions in the PUSCH occasion. The transport block size, $N_{TBS}$ is the number of higher layer bits that can be carried in the PUSCH occasion. This can be compared to the number of bits needed to carry all logical channels comprising the message, $N_{info}$, and if $N_{info} < N_{TBS}$, the message will fit into the PUSCH occasion.

Therefore, in an embodiment 'A', a WD 22, such as for example via processing circuitry 84 and/or radio interface 82, transmits a PUSCH in a random access procedure and indicates a configuration used for the transmission of the PUSCH. The WD 22, such as via radio interface 82, receives higher open systems interconnection (OSI) layer signaling identifying a first and a second preamble set. The WD 22 further receives, such as via radio interface 82, higher layer signaling that provides a first configuration for the PUSCH and identifies at least one of a modulation and coding state, a number of OFDM symbols, and a number of physical resource blocks. The WD 22, such as for example via processing circuitry 84, may also determine a set of information bits to transmit, where the set includes $N_{info}$ information bits used by one or more logical channels. In some aspects, the WD 22 determines a first transport block size, $N_{TBS}(1)$ according to at least one of the modulation and coding state, the number of OFDM symbols, and the number of physical resource blocks identified by the first configuration. If $N_{info} \leq N_{TBs}(1)$ the WD 22, such as for example via radio interface 82 and/or processing circuitry 84, may transmit a preamble identified by the first preamble set and may transmit PUSCH carrying $N_{info}$ bits using the first configuration.

In some embodiments, if the network node 16 provides a WD 22 more than one configuration for PUSCH occasions, the WD 22 may choose the configuration that best matches the channel condition, thereby transmitting larger msgA when channel conditions are better, and increasing throughput of msgA in a cell. In such cases, the WD 22 may determine the transport block size that can be supported by each of the PUSCH occasion configurations it can use for msgA transmission using e.g., the methods described above. The WD 22 can then select a configuration that can carry the bits available for transmission in msgA by selecting the configuration that supports the smallest transport block size than can still carry msgA.

The above method can be implemented by a variant of embodiment 'A' above, where the WD 22 further receives higher layer signaling that provides a second configuration for the PUSCH and identifies at least one of a modulation and coding state, a number of OFDM symbols, and a number of physical resource blocks. The WD 22 may determine a second transport block size, $N_{TBS}(2)$ according to at least one of the modulation and coding state, the number of OFDM symbols, and the number of physical resource blocks identified by the second configuration. In some embodiments, when $N_{TBs}(1) < N_{info} \leq N_{TBS}(2)$, the WD 22 transmits a preamble identified by the second preamble set, and also transmits a PUSCH carrying the set of information bits using the second configuration.

Some proposed methods in a WD 22 for a two-step RA procedure may include one or more of the following steps:
1. Receive a two-step RA configuration for a cell from a network node 16, such as, for example, receive 2-step RA configuration information from a network node 16, including at least one or more of:
    PUSCH resource allocations, comprising one or more of:
        i. Time/frequency resources.
        ii. MCS(s).
        iii. Transmit power instruction.
        iv. Redundancy version (may be fixed or hard coded).
    Preambles associated with the PUSCH resource allocations. For example, the PUSCH resource allocations may include a first resource allocation for a PUSCH of a first message, msgA, of the two-step RA procedure, the first resource allocation for the PUSCH transmission of the msgA may be associated with a first set of preambles; and a second resource allocation for the PUSCH transmission of the msgA associated with a second set of preambles.
    Transmit power instructions associated with the PUSCH resource allocations and/or associated preambles.
        i. e.g., in relation to the downlink pathloss.
2. Obtain a trigger to initiate random access. This may be any of the previously described events, such as:
    Arrival of UL data in the UL buffer.
        i. when the WD 22 is in RRC_IDLE or RRC_INACTIVE state (including when the WD 22 is powered on or returns from a period without coverage and needs to register in the network); or
        ii. when the WD 22 is in RRC_CONNECTED state and lacks a valid timing advance.
    Reception of a paging message addressed to the WD 22.
    Execution of a handover (i.e., triggered by reception of a handover command, i.e. an RRCReconfiguration message with a reconfiguration with sync IE, from the serving gNB/network node) or instruction to add an SCell).
    Reception of a PDCCH order to initiate random access.
    Determined need to acquire on-demand system information (relevant in case 2-step RA ends up being specified for this random access case). This may be triggered by:
        i. Entrance into a new cell (for which a valid version of the concerned system information is not stored in the WD 22).
        ii. Power on of the WD 22 (or return after a period of lack of coverage).
        iii. Time out of the validity of the concerned system information.
        iv. Reception of a notification that the concerned system information has been updated.
    Initiation of an application or service or function in the WD 22, which requires information from a SIB which has not been previously acquired and/or for which a valid version is not stored in the WD 22.
3. If not already performed, select a beam, e.g., SSB or CSI-RS, and, if not already done, acquiring the RA/RACH configuration associated with the selected beam.
4. Determine that 2-step RA configuration and resources are available for the current beam (e.g., SSB or CSI-RS) and that 2-step RA is suitable for the trigger of the random access.
5. Based on the 2-step RA configuration, select the PRACH occasion (in terms of time/frequency resources) to use, e.g., the next one in time or one of the next ones in case of multiple PRACH occasions for 2-step RA are frequency-multiplexed.
6. Determine the msgA size (i.e., a payload size of the PUSCH transmission of the msgA) and compare it with the sizes of available PUSCH resource allocations, possibly also taking into account other relevant aspects, such as the current radio channel conditions (e.g. in terms of pathloss, RSRP, RSRQ, RSSI, SNR or SINR), MCS(s) associated with each available PUSCH resource allocation and/or possible transmit power instructions (and their resulting transmit powers) associated with the available PUSCH resource allocations (e.g., a first and second PUSCH resource allocation).

7. Select one of the first and second PUSCH resource allocation and the associated one of the first and second set of preambles based on the two-step RA configuration and a payload size of the PUSCH transmission of the msgA. For example, select a PUSCH resource allocation (or a set of PUSCH resource allocations with the same properties in terms of size and other possible associated characteristics) which is optimal (or suitable) for the msgA, in terms of PUSCH resource allocation size (in relation to the msgA size, taking into account the impact of the modulation and coding on the number of bits to be transmitted), possibly also taking other relevant aspects into account, such as for example one or more of: the current radio channel conditions (e.g., in terms of pathloss, RSRP, RSRQ, RSSI, SNR or SINR), MCS(s) associated with each available PUSCH resource allocation and/or possible transmit power instructions (and the resulting transmit powers) associated with the available PUSCH resource allocations (e.g., a first and second PUSCH resource allocation).

8. Select a preamble for the msgA transmission of the two-step RA procedure from the selected one of the first and second set of preambles. For example, select a preamble associated with the selected PUSCH resource allocation or one of the selected PUSCH resource allocations (in case multiple PUSCH resource allocations have the same suitable/optimal characteristics).

There may be one preamble associated with each PUSCH resource allocation; or a set of preambles associated with each PUSCH resource allocation.

9. Transmit the PUSCH transmission of the msgA using the selected one of the first and second PUSCH resource allocation. For example, transmit MsgA including the selected preamble and $MsgA_{PUSCH}$.

The selected preamble is transmitted on the selected PRACH resources.

$MsgA_{PUSCH}$ is transmitted on the selected allocated PUSCH resource allocation, i.e., the PUSCH resource associated with the selected preamble.

10. Receive MsgB from the network node 16 and continue normal operation.

In some embodiments, with the dynamic MCS selection described herein above, i.e. where a PUSCH resource allocation can be associated with multiple different MCSs, from which the WD 22 can choose one, e.g., based on the radio link quality (e.g., the estimated pathloss, measured RSRP, RSRQ, RSSI, SNR or SINR) and the $MsgA_{PUSCH}$ message size, the selection of MCS and PUSCH resource allocation size (and thus the preamble group) may be intertwined/performed jointly or in sequence. As one option, the WD 22 can first determine the MCS, based on the radio link condition (e.g., the estimated pathloss) and configured thresholds (if any), and then select the PUSCH resource allocation and associated preamble group based on the required resource size resulting from applying the selected MCS on the $MsgA_{PUSCH}$, e.g., as described in chapter 7.1.7 in 3GPP TS 38.213, version 15.6.0 (the transport block size (TBS) would then be the number of information bits in $MsgA_{PUSCH}$ and any additional padding bits used to fill up the PUSCH resource allocation). As another option, the WD 22 may first select the PUSCH resource allocation size (and thus the associated preamble group) and then select a suitable MCS to make $MsgA_{PUSCH}$ fit in the selected allocated PUSCH resource (preferably the most robust MCS that allows $MsgA_{PUSCH}$ to fit in the selected allocated PUSCH resource). As yet another option, an iterative process may be applied to jointly select the MCS and the PUSCH resource allocation, or any other implementation selection procedure.

In some embodiments, if msgA size-dependent conditions are configured for usage of different PUSCH resource allocations (and thus for selection of associated preambles or preamble groups) for msgA transmission, the following example changes marked with bold text could be applied to the 3GPP NR specification TS 38.321, version 15.6.0:

Random Access Resource Selection

The MAC entity may:

1> if the Random Access procedure was initiated for beam failure recovery (as specified in subclause 5.17); and 1> if the beamFailureRecoveryTimer (in subclause 5.17) is either running or not configured; and 1> if the contention-free Random Access Resources for beam failure recovery request associated with any of the SSBs and/or CSI-RSs have been explicitly provided by RRC; and 1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:

2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;

2> if CSI-RS is selected, and there is no ra-PreambleIndex associated with the selected CSI-RS:

3> set the PREAMBLE INDEX to a ra-PreambleIndex corresponding to the SSB in candidateBeamRSList which is quasi-colocated with the selected CSI-RS as specified in TS 38.214, version 15.6.0.

2> else:

3> set the PREAMBLE INDEX to a ra-PreambleIndex corresponding to the selected SSB or CSI-RS from the set of Random Access Preambles for beam failure recovery request.

1> else if the ra-PreambleIndex has been explicitly provided by PDCCH; and

1> if the ra-PreambleIndex is not 0b000000:

2> set the PREAMBLE INDEX to the signalled ra-PreambleIndex;

2> select the SSB signalled by PDCCH.

1> else if the contention-free Random Access Resources associated with SSBs have been explicitly provided in rach-ConfigDedicated and at least one SSB with SS-RSRP above rsrp-ThresholdSSB amongst the associated SSBs is available:

2> select an SSB with SS-RSRP above rsrp-ThresholdSSB amongst the associated SSBs;

2> set the PREAMBLE INDEX to a ra-PreambleIndex corresponding to the selected SSB.

1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:

2> select a CSI-RS with CSI-RSRP above rsrp-ThresholdCSI-RS amongst the associated CSI-RSs;

2>set the PREAMBLE INDEX to a ra-PreambleIndex corresponding to the selected CSI-RS.
1>else if the Random Access procedure was initiated for SI request (as specified in TS 38.331, 15.6.0); and
1>if the Random Access Resources for SI request have been explicitly provided by RRC:
  2>if at least one of the SSBs with SS-RSRP above rsrp-ThresholdSSB is available:
    3>select an SSB with SS-RSRP above rsrp-ThresholdSSB.
  2>else:
    3>select any SSB.
  2>select a Random Access Preamble corresponding to the selected SSB, from the Random Access Preamble(s) determined according to ra-PreambleStartIndex as specified in TS 38.331, version 15.6.0;
  2>set the PREAMBLE INDEX to selected Random Access Preamble.
1>else if the Random Access procedure is a 2-step RA procedure (i.e. for the 2-step contention-based Random Access preamble selection):
  2>if at least one of the SSBs with SS-RSRP above rsrp-ThresholdSSB is available:
    3>select an SSB with SS-RSRP above rsrp-ThresholdSSB.
  2>else:
    3>select any SSB.
  2>if MsgA has not yet been transmitted:
    3>if Random Access Preambles groups are configured:
      4>if the potential MsgA size (UL data available for transmission plus MAC header and, where required, MAC CEs) is less than ra-MsgASizeGroupk and greater than or equal to ra-MsgASizeGroupk-1 and the pathloss is less than PCMAXgroupk-1 (of the Serving Cell performing the Random Access Procedure)—preambleReceivedTargetPower-msg3-DeltaPreamble-messagePowerOffsetGroupk; or
      4>if the Random Access procedure was initiated for the CCCH logical channel and the CCCH SDU size plus MAC subheader is greater than ra-MsgASizeGroupk-1:
        5>select the Random Access Preambles group k.
      4>else:
        5>select the Random Access Preambles group k−1.
    3>else:
      4>select the Random Access Preambles group A.
  2>else (i.e. MsgA is being retransmitted):
    3>select the same group of Random Access Preambles as was used for the Random Access Preamble transmission attempt corresponding to the first transmission of MsgA.
  2>select a Random Access Preamble randomly with equal probability from the Random Access Preambles associated with the selected SSB and the selected Random Access Preambles group.
  2>set the PREAMBLE INDEX to the selected Random Access Preamble.
1>else (i.e. for the 4-step contention-based Random Access preamble selection):
  2>if at least one of the SSBs with SS-RSRP above rsrp-ThresholdSSB is available:
    3>select an SSB with SS-RSRP above rsrp-ThresholdSSB.
  2>else:
    3>select any SSB.
  2>if Msg3 has not yet been transmitted:
    3>if Random Access Preambles group B is configured:
      4>if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower-msg3-DeltaPreamble-messagePowerOffsetGroupB; or
      4>if the Random Access procedure was initiated for the CCCH logical channel and the CCCH SDU size plus MAC subheader is greater than ra-Msg3SizeGroupA:
        5>select the Random Access Preambles group B.
      4>else:
        5>select the Random Access Preambles group A.
    3>else:
      4>select the Random Access Preambles group A.
  2>else (i.e. Msg3 is being retransmitted):
    3>select the same group of Random Access Preambles as was used for the Random Access Preamble transmission attempt corresponding to the first transmission of Msg3.
  2>select a Random Access Preamble randomly with equal probability from the Random Access Preambles associated with the selected SSB and the selected Random Access Preambles group.
  2>set the PREAMBLE INDEX to the selected Random Access Preamble.
1>if the Random Access procedure was initiated for SI request (as specified in TS 38.331, version 15.6.0); and
1>if ra-AssociationPeriodIndex and si-RequestPeriod are configured:
  2>determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to subclause 8.1 of TS 38.213, version 15.6.0 corresponding to the selected SSB).
1>else if an SSB is selected above:
  2>determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to subclause 8.1 of TS 38.213, version 15.6.0, corresponding to the selected SSB; the MAC entity may take into account the possible occurrence of measurement gaps when determining the next available PRACH occasion corresponding to the selected SSB).
1>else if a CSI-RS is selected above:
  2>if there is no contention-free Random Access Resource associated with the selected CSI-RS:
    3>determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214, version 15.6.0 (the MAC entity shall select a PRACH occasion randomly with equal probability amongst the consecutive PRACH occasions according to subclause 8.1 of TS 38.213, version 15.6.0, corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).

2>else:

3>determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

1>perform the Random Access Preamble transmission procedure (see subclause 5.1.3).

NOTE: When the WD 22 determines if there is an SSB with SS-RSRP above rsrp-ThresholdSSB or a CSI-RS with CSI-RSRP above rsrp-ThresholdCSI-RS, the WD 22 uses the latest unfiltered Layer 1 (L1)-RSRP measurement.

Note 1: In the example specification modifications above, it may, for simplicity, be assumed that 2-step RA is not used for SI request. However, if 2-step RA is to be applied for the Msg3-based SI request method (making the Msg3 a part of MsgA), then the principles in this disclosure would be applicable to that procedure as well.

Note 2: The example specification modifications above should be seen precisely as that, i.e. examples. The example modifications do not cover all embodiments and, in addition, for a full specification of the inventive solution, additional specifications and specification chapters would be affected.

Possible Extensions and Variations

Multiple MCSs Per PUSCH Resource Allocation

In some embodiments, a possible extension, or variation, of the above described solution is that in the 2-step RA configuration the network node 16 associates a set of MCSs with each PUSCH resource allocation and a WD 22 may use one of the associated MCSs when transmitting $MsgA_{PUSCH}$ on an allocated PUSCH resource. As one possible configuration option, absence of explicit MCS configuration could mean that the set of MCSs includes all specified MCSs.

WD Autonomous Selection of MCS for the MsgAPUSCH Transmission

As one option, the WD 22, such as for example via processing circuitry 84, selects the MCS autonomously (i.e., according to an implementation dependent procedure). This autonomous selection may be based on the radio channel conditions and/or strength and/or quality of received downlink transmissions (e.g. estimated pathloss, estimated BLER, measured RSRP, RSRQ, RSSI, SNR or SINR). The size of $MsgA_{PUSCH}$ message (e.g., in terms of information bits) in relation to the size of the concerned PUSCH resource allocation (e.g., in terms of PRBs) may also be input to the WD-autonomous MCS selection algorithm. Other possible input data that may form part of the basis for the MCS selection may be the transmit power instruction (and its resulting transmit power) associated with the PUSCH resource allocation (if any) or a transmit power instruction (and its resulting transmit power) associated with the MCS or the combination of PUSCH resource allocation and MCS, or the WD's 22 current power headroom (e.g., in relation to a transmit power resulting from a transmit power instruction associated with the PUSCH resource allocation). Yet other inputs to the WD's 22 MCS selection algorithm may be the logical channel for the transmission of $MsgA_{PUSCH}$, whether $MsgA_{PUSCH}$ contains control signaling or user data or both, how suitable $MsgA_{PUSCH}$ is for segmentation, etc. As previously mentioned, the selection of MCS may be integrated with the PUSCH resource allocation (and thus the associated preamble or preamble group) selection, e.g., intertwined in an iterative algorithm/process, or the selection of PUSCH resource (and thus the associated preamble or preamble group) and the selection of MCS may be performed in sequence, either with the MCS selection first followed by the PUSCH resource allocation (and thus the associated preamble or preamble group) or the other way around.

In some embodiments, when the WD 22 autonomously selects a combination of MCS and PUSCH resource allocation of a suitable size (given the $MsgA_{PUSCH}$ message size and the MCS), the WD 22 has a possibility to choose different PUSCH resource allocation sizes matching the $MsgA_{PUSCH}$ message size by varying the choice of MCS. This flexibility and freedom given to the WD 22 comes with a risk that WD 22 implementations tend to have a bias towards certain strategies resulting in unforeseen and unwanted PUSCH resource allocation size choices (or an unwanted distribution of PUSCH resource allocation size choices across multiple WDs 22). To mitigate this risk, there may be configured or specified rules or conditions preventing unwanted combination choices. For instance, there may be rules or conditions preventing a WD 22 from selecting excessively large PUSCH resource allocations, in order to avoid that WDs 22 have a bias towards selection of large PUSCH resource allocations, which would increase the risk for, and frequency of, preamble collisions. The largest PUSCH resource allocations should be chosen only by WDs 22 that really need it.

Network-Guided Selection of MCS for the MsgAPUSCH Transmission

As another option, the network node 16 may guide, or control, the WD's 22 MCS selection, e.g. through configured conditions, such as thresholds. Such thresholds may be related to any of the aspects mentioned above for the option of WD 22 autonomous MCS selection, e.g. the radio channel conditions and/or strength and/or quality of received downlink transmissions (e.g. estimated pathloss, estimated BLER, measured RSRP, RSRQ, RSSI, SNR or SINR), the size of $MsgA_{PUSCH}$ (e.g. in terms of number of information bits), e.g. in relation to the size of the PUSCH resource allocations (e.g. in terms of number of PRBs), the WD's 22 power headroom (e.g. relation to a transmit power resulting from a transmit power instruction associated with the PUSCH resource allocation (if any) or in relation to a transmit power resulting from a transmit power instruction associated with the MCS or the combination of PUSCH resource allocation and MCS), the logical channel for the transmission of $MsgA_{PUSCH}$ or other aspects of $MsgA_{PUSCH}$, such as whether it contains control signaling or user data or both, how suitable it is for segmentation, etc. Again, as described above, the selection of PUSCH resource allocation (and thus the associated preamble or preamble group) and MCS may be performed jointly, e.g. as an iterative process, or in sequence with either the MCS selection performed first followed by the PUSCH resources allocation (and thus the associated preamble or preamble group) selection or the other way around. If the network node's 16 guidance of the WD's 22 choice of MCS and PUSCH resource allocation size gives some freedom to the WD 22, then rules or conditions preventing unwanted choices, such as a bias towards selection of excessively large PUSCH resource allocations, as described above, may be useful in this solution variant as well.

Configuration of Transmit Power Combined with MCS

In some embodiments, in the 2-step RA configuration, a different transmit power instruction may be associated with each selectable MCS, e.g., each selectable MCS associated with the same PUSCH resource allocation. In this context, a transmit power instruction may include, e.g., one or more parameters to be used in an algorithm for deriving the transmit power in relation to the estimated downlink path loss. Such a parameter may e.g., impact how high the transmit power is set in relation to the estimated pathloss, thereby also impacting the expected receive power at the network node 16 (e.g., gNB).

In some embodiments, one principle used when configuring different transmit power instructions for different MCSs may be, for instance, that the less robust the MCS is, the higher the transmit power resulting from the associated instruction may be (in order to increase the reception power at the network node 16 (e.g., gNB) to compensate for the less robust MCS). As mentioned above, the WD 22 may take these configured transmit power instructions into account when selecting the MCS (or when selecting the combination of PUSCH resource allocation and MCS (and transmit power)).

In some embodiments, a similar approach can be based on power control for a PUSCH occasion. As discussed in more detail above, in 3GPP RAN1 #97, the formula for power control below for MsgA PUSCH power $P_{PUSCH}(i)$ in transmission instance i was agreed:

$$P_{PUSCH}(i) = \max(P_{CMAX}, [\text{MsgA}]\text{preambleReceived-TargetPower} + \Delta_{MsgA\_PUSCH} + 10 \log_{10}(2^{\mu} M_{RB}^{PUSCH}(i)) + \alpha PL(i) + \Delta_{TF}(i) + \Delta_{rampup}(i)).$$

It can first be observed that the power control attempts to set the power to a nominal value represented by the term:

$$[\text{MsgA}]\text{preambleReceivedTargetPower} + \Delta_{MsgAPUSCH} + 10 \log_{10}(2^{\mu} M_{RB}^{PUSCH}(i)) + \alpha PL(i) + \Delta_{TF}(i) + \Delta_{rampup}(i).$$

However, if this term is greater than a maximum value, $P_{CMAX}$ the formula limits the power to $P_{CMAX}$. When the power is less than $P_{CMAX}$, the power should be in the range where PUSCH should operate with the desired reliability. When the power is greater than $P_{CMAX}$, this may imply that insufficient power is available to transmit with the desired reliability.

It can next be observed that the power control varies with $\Delta_{TF}(i)$, which is to function in 2-step RACH in the same was as $\Delta_{TF,b,f,c}(i)$ that is defined in 3GPP NR Rel-15 in 38.213 section 7.1.1 as:

$$\Delta_{TF,b,f,c}(i) = 10 \log_{10}((2^{BPRE \cdot K_s} - 1) \cdot \beta_{offset}^{PUSCH}) \text{ for } K_s = 1.25 \text{ and } \Delta_{TF,b,f,c}(i) = 0 \text{ for } K_s = 0$$

where $K_S$ is provided by deltaMCS for each UL BWP b of each carrier f and serving cell c. If the PUSCH transmission is over more than one layer [6, TS 38.214, version 15.6.0], $\Delta_{TF,b,f,c}(i)=0$. BPRE and $\beta_{offset}^{PUSCH}$, for active UL BWP b of each carrier f and each serving cell c, are computed as below This implies that $\Delta_{TF}(i)$ will depend on the bits per resource element (BPRE) used in msgA transmission, and therefore the modulation and coding state (MCS) and number of OFDM symbols used to transmit PUSCH. It may similarly be observed, that the power will depend on the number of resource blocks used, $M_{RB}^{PUSCH}$, and a power offset $\Delta_{MsgA\_PUSCH}$. Therefore, when any $\Delta_{TF}(i)$, MCS, the number of PRBs, and the number of OFDM symbols to be used are configured for a PUSCH occasion, they can affect whether the WD 22 has sufficient power to transmit a PUSCH using the configuration.

Therefore, in an embodiment, a WD 22, such as for example via processing circuitry 84, selects a msgA PUSCH occasion configuration according to whether there is sufficient power to transmit the configuration and identifies it to the network node 16 by transmitting an associated preamble, and may optionally remove low priority logical channels in order to reach a msgA size for which there is sufficient power to transmit. The WD 22 may receive higher layer signaling from e.g., network node 16 that provides a first and a second configuration for the PUSCH where each configuration identifies at least one of a modulation and coding state, a number of OFDM symbols, and a number of physical resource blocks. The WD 22, such as for example via processing circuitry 84, may also determine a set of information bits to transmit, the set including $N_{info}$, information bits used by one or more logical channels. The WD 22 may determine a first and a second transport block size, $N_{TBs}(1)$ and $N_{TBS}(2)$, according a respective at least one of the modulation and coding state, the number of OFDM symbols, and the number of physical resource blocks identified by each of the first and second configuration. In some embodiments, the WD 22, such as for example via processing circuitry 84, determines a first and a second power with which to transmit the PUSCH according to the first and the second configuration. In some embodiments, if $N_{TBS}(1) < N_{info}$ and the second power is greater than or equal to a maximum transmit power, Pcmax, the WD 22, such as for example via processing circuitry 84 and/or radio interface 82, performs a step of removing the information bits used by a one of the logical channels from the set of information bits according to a priority of the logical channel. Subsequently, if $N_{TBS}(1) < N_{info}$, the WD 22 repeats the step of removing information bits for bits used by a different one of the logical channels until $N_{info} \leq N_{TBs}(1)$. In some embodiments, next, the WD 22 transmits a preamble identified by the first preamble set and then a PUSCH carrying the set of information bits using the first configuration. However, if $N_{TBS}(1) < N_{info} \leq N_{TBS}(2)$ and the second power is less than Pcmax, the WD 22, such as for example via processing circuitry 84 and/or radio interface 82, may transmit a preamble identified by the second preamble set and then a PUSCH carrying the set of information bits using the second configuration.

Reception of MsgAPUSCH Transmission with Unknown MCS

When the network node 16, e.g., a gNB, receives a $MsgA_{PUSCH}$ transmission for which the MCS is unknown (i.e., it is one of the selectable MCSs associated with this PUSCH transmission resource), the network node 16, e.g., the gNB, has to blindly try to decode the $MsgA_{PUSCH}$ transmission with each of the possible MCSs, until successful decoding is achieved or decoding has failed for all the possible MCSs.

MCS Indication by Associated Preamble

As one option, each MCS associated with a PUSCH resource allocation for $MsgA_{PUSCH}$ transmission can have its own associated preamble (or set of preambles). For instance, if two different MCSs are associated with PUSCH resource allocation, then two different preambles (or two disjoint sets of preambles) could be associated with the PUSCH resources allocations, one for each of the two MCSs. This solution may eliminate the need for blind decoding by network node 16 of $MsgA_{PUSCH}$, since the network node 16, e.g. the gNB, would be able to derive the MCS used for the $MsgA_{PUSCH}$ transmission from the received preamble.

Shrinking msgA to Fit in a PUSCH Occasion

In some embodiments, the WD 22 may have more data than can fit in the largest PUSCH occasion available for use by the WD 22 for msgA. Rather than simply not transmitting msgA in such cases, prioritization methods may be used to drop lower priority data from msgA. In Rel-15 NR, a WD 22 may receive, such as for example via radio interface 82, an uplink grant from which it can determine a transport block size that it can transmit in a PUSCH carrying higher layer data in the resources allocated by the grant. When the grant is insufficient to carry a message in Rel-15, the WD 22 may drop logical channels with lower priority until the message size is small enough to fit the grant. WDs 22 are generally not provided grants in two-step RACH operation, and so WDs 22 may determine the maximum message size used for any logical channel prioritization rather than being provided it implicitly through the grant. Furthermore, a WD 22 may be configured with more than one PUSCH occasion configuration that it may use to carry msgA. In such cases, it may be desirable for the WD 22 to transmit as much data as possible to increase the spectral efficiency of the network. The maximum amount of data to be transmitted can be determined by e.g., finding a PUSCH occasion whose configuration supports the largest transport block size of all PUSCH occasion configurations provided to the WD 22. Therefore, when a WD 22 has multiple PUSCH occasion configurations it can use for a msgA transmission, the WD 22 may, such as for example via processing circuitry 84, determine the transport block size supported by each configuration, and select the largest transport block size as the target size to be used for msgA in a logical channel prioritization procedure. In some embodiments, the WD 22 removes lower priority logical channels one at a time, lowest priority first, removing all the bits to carry a given logical channel, until the number bits needed by msgA is less than or equal to the transport block size. When the number of msgA bits is less than the transport block size, mechanisms such as padding or padding buffer status reports can optionally be used to increase the number of msgA bits to be closer to the transport block size.

One or more of the above methods can be implemented using an embodiment in which a WD 22, such as for example via processing circuitry 84 and/or radio interface 82, receives higher layer signaling (e.g., RRC) identifying a first and a second preamble set. WD 22 further receives, such as for example via processing circuitry 84 and/or radio interface 82, higher layer signaling that provides a PUSCH configuration and identifies at least one of a modulation and coding state, a number of OFDM symbols, and a number of physical resource blocks. WD 22, such as for example via processing circuitry 84, also determines a set of information bits to transmit, where the set contains $N_{info}$ information bits used by one or more logical channels. The WD 22, such as for example via processing circuitry 84, determines a transport block size, $N_{TBS}$ according to at least one of the modulation and coding state, the number of OFDM symbols, and the number of physical resource blocks identified by the PUSCH configuration. When $N_{info} > N_{TBS}$, the WD 22, such as for example via processing circuitry 84, performs a step of removing the information bits used by a one of the logical channels from the set of information bits according to a priority of the logical channel. Subsequently, while $N_{info} > N_{TBS}$, the WD 22 repeats the step of removing information bits for bits used by a different one of the logical channels until $N_{info} \leq N_{TBS}$. The WD 22 then transmits a preamble identified by the first preamble set and then a PUSCH carrying the set of information bits using the configuration.

MCS-Differentiated PUSCH Resource Allocations with Use Conditioned by the Channel Quality Another possible variation of the solutions provided in this disclosure is that different PUSCH resource allocations, with corresponding associated preambles or preamble groups, are associated with different MCSs (albeit only one MCS per PUSCH resource allocation). Then, if explicit conditions are configured for selection of preambles or preamble groups (based on their associated PUSCH resources and in turn associated MCSs), these conditions could be expressed in terms of a radio channel quality related measure, such as estimated pathloss, estimated BLER, RSRP, RSRQ, SNR or SINR. As a preferred example, a better signal/radio channel quality (e.g. lower estimated pathloss or BLER or higher RSRP, RSRQ, SNR or SINR) may be required, the less robust the MCS is. As an alternative to explicitly configured signal/radio channel quality related conditions, it may be left to the WD 22 to autonomously determine if a certain signal/radio channel quality is good enough to allow the WD 22 to select a preamble or preamble group associated with a certain MCS (where the association may be indirect via the PUSCH resource allocation). As yet another option, the signal/radio channel quality related conditions may be combined with msgA size conditions and the different PUSCH resource allocations may have both different MCSs and different sizes. Note that the PUSCH resource allocations may have different sizes in terms of the number of PRBs, but they may also differ in the number of information bits they can fit, given the associated MCS. For instance, two different PUSCH resource allocations may have the same number of PRBs, but different associated MCSs and then the PUSCH resource allocation with the less robust MCS will fit a greater number of information bits than the other PUSCH resource allocation.

Self-Organizing Network (SON) Function Learning Suitable PUSCH Resource Allocation Size Distribution In some embodiments, a SON function may be used to learn which distribution of PUSCH resource allocation sizes (and associated conditions if any) that fits the needs of the WDs 22 (where the WDs 22 in a particular network and/or area will have a distribution of different types of WDs 22, or WDs 22 with different user behaviors, or WDs 22 running different applications with different requirements and traffic patterns). Adaptation of such a suitable distribution of PUSCH resource allocation sizes should aim to achieve a reasonably even distribution of the WDs 22 to the allocated PUSCH transmission resources and thus the available preambles.

In some embodiments, input data to the SON function may include statistics on the behavior of the WDs 22 accessing the network (possibly per area) in terms of utilized PUSCH resource allocation sizes for $MsgA_{PUSCH}$ transmissions, the sizes of the MsgA$_{PUSCH}$ messages and, if relevant, the MCSs used for the MsgA$_{PUSCH}$ transmissions. Possibly, statistics related to performed 2-step random access procedures may also be part of the input data, e.g. statistics on preamble collisions, statistics on PUSCH resource allocation usage collisions and/or success/failure statistics.

PUSCH Resource Configuration in RRC Release Message

In this embodiment, the PUSCH resource configuration for 2-step RA may be provided by the network node 16 (e.g., gNB), such as for example via processing circuitry 68 and/or radio interface 62 when the connection is released to IDLE or INACTIVE mode (also called a release message). The resource configuration provided by the network node 16 (e.g., gNB) may for instance be determined on the service requirements, type of traffic (e.g., URLLC or Machine-type Communication (MTC)), mobility of the WD 22 or the WD 22 type. This could allow for certain high-priority WDs 22 to be given resource configurations for larger and robust allocations and for low-priority to receive a smaller and less frequent allocations. The resource configuration could also for instance give certain WDs 22 access to more "high-quality" beams.

Some embodiments, which may be implemented by WD 22 and/or network node 16, to configure 2-step RA support may include one or more of the following:

1. (WD 22, such as for example via processing circuitry 84 and/or radio interface 82, indicates to network node 16 (e.g., gNB) if msgA fits in a RO by selecting and transmitting a preamble.) A method of transmitting (e.g., by WD 22) a PUSCH in a random access procedure and indicating a configuration used for the transmission of the PUSCH includes one or more of the following:
   a. WD 22 receiving (and network node 16 transmitting) higher layer signaling identifying a first and a second preamble set;
   b. WD 22 receiving (and network node 16 transmitting) higher layer signaling that provides a first configuration for the PUSCH and identifies at least one of a modulation and coding state, a number of OFDM symbols, and a number of physical resource blocks;
   c. WD 22 determining a set of information bits to transmit, wherein the set contains $N_{info}$, information bits used by one or more logical channels;
   d. WD 22 determining a first transport block size, $N_{TBS}(1)$ according to at least one of the modulation and coding state, the number of OFDM symbols, and the number of physical resource blocks identified by the first configuration; and/or
   e. If $N_{info} \leq N_{TBS}(1)$,
      i. WD 22 transmitting (and network node 16 receiving) a preamble identified by the first preamble set, and
      ii. WD 22 transmitting (and network node 16 receiving) PUSCH carrying the set of information bits using the first configuration.
2. (WD 22 drops low priority logical channels so that msgA fits in the PO) The method of embodiment 1, further comprising when $N_{info} > N_{TBS}(1)$,
   a. WD 22 performing a step of removing the information bits used by a one of the logical channels from the set of information bits according to a priority of the logical channel;
   b. WD 22 subsequently, if $N_{info} > N_{TBs}(1)$, repeating the step of removing information bits for bits used by a different one of the logical channels until $N_{info} \leq N_{TBs}(1)$;
   c. WD 22 transmitting (and network node 16 receiving) a preamble identified by the first preamble set; and
   d. WD 22 transmitting (and network node 16 receiving) PUSCH carrying the set of information bits using the first configuration.
3. (WD 22 indicates which one of multiple configurations are used) The method of any of embodiments 1 and 2, further comprising one or more of:
   a. WD 22 receiving (and network node 16 transmitting) higher layer signaling that provides a second PUSCH configuration and identifies at least one of a modulation and coding state, a number of OFDM symbols, and a number of physical resource blocks; and
   b. WD 22 determining a second transport block size, $N_{TBs}(2)$ according to at least one of the modulation and coding state, the number of OFDM symbols, and the number of physical resource blocks identified by the second PUSCH configuration; and/or
   c. if $N_{TBS}(1) < N_{info} \leq N_{TBS}(2)$,
      i. WD 22 transmitting (and network node 16 receiving) a preamble identified by the second preamble set, and
      ii. WD 22 transmitting (and network node 16 receiving) PUSCH carrying the set of information bits using the second configuration.
4. (If too much power is needed by a larger configuration, drop low priority logical channels to fit into a smaller configuration.) The method of embodiment 3, further comprising one or more of:
   a. WD 22 determining a first and a second power with which to transmit the PUSCH according to the first and the second configuration;
   b. If $N_{TBS}(1) < N_{info}$ and the second power is greater than or equal to a maximum transmit power, Pcmax
      i. WD 22 performing a step of removing the information bits used by a one of the logical channels from the set of information bits according to a priority of the logical channel;
      ii. WD 22 subsequently, if $N_{TBs}(1) < N_{info}$, repeating the step of removing information bits for bits used by a different one of the logical channels until $N_{info} \leq N_{TBs}(1)$;
      iii. WD 22 transmitting (and network node 16 receiving) a preamble identified by the first preamble set, and
      iv. WD 22 transmitting (and network node 16 receiving) PUSCH carrying the set of information bits using the first configuration.
   c. if $N_{TBs}(1) < N_{info} \leq N_{TBS}(2)$ and the second power is less than Pcmax:
      i. WD 22 transmitting (and network node 16 receiving) a preamble identified by the second preamble set, and
      ii. WD 22 transmitting (and network node 16 receiving) PUSCH carrying the set of information bits using the second configuration.

Some embodiments may include one or more of the following:

Embodiment A1. A network node configured to communicate with a wireless device (WD), the network node configured to, and/or comprising a radio interface and/or comprising processing circuitry configured to:
    configure the WD with at least one two-step random access (RA) configuration; and/or receive a preamble and/or a msgA PUSCH, the preamble and/or the msgA PUSCH resource based at least in part on the at least one two-step RA configuration.

Embodiment A2. The network node of Embodiment A1, wherein:
the preamble and/or the msgA PUSCH resource is further based at least in part on a two-step RA configuration associated with a WD-selected beam.

Embodiment A3. The network node of Embodiment A1, wherein:
the preamble and/or the msgA PUSCH resource is further based at least in part on a payload size for the msgA PUSCH.

Embodiment B1. A method implemented in a network node, the method comprising:
configuring the WD with at least one two-step random access (RA) configuration; and/or
receiving a preamble and/or a msgA PUSCH, the preamble and/or the msgA PUSCH resource based at least in part on the at least one two-step RA configuration.

Embodiment B2. The method of Embodiment B1, wherein:
the preamble and/or the msgA PUSCH resource is further based at least in part on a two-step RA configuration associated with a WD-selected beam.

Embodiment B3. The method of Embodiment B1, wherein:
the preamble and/or the msgA PUSCH resource is further based at least in part on a payload size for the msgA PUSCH.

Embodiment C1. A wireless device (WD) configured to communicate with a network node, the WD configured to, and/or comprising a radio interface and/or processing circuitry configured to:
obtain at least one two-step random access (RA) configuration; and/or
select a preamble and/or a msgA PUSCH resource based at least in part on the at least one two-step RA configuration.

Embodiment C2. The WD of Embodiment C1, wherein the WD is further configured to, and/or the radio interface is further configured to and/or the processing circuitry is further configured to:
select a beam, the selection of the preamble and/or the msgA PUSCH resource based at least in part on a two-step RA configuration associated with the selected beam.

Embodiment C3. The WD of any one of Embodiments C1 and C2, wherein:
the selection of the preamble and/or the msgA PUSCH resource based at least in part on a payload size for the msgA PUSCH.

Embodiment D1. A method implemented in a wireless device (WD), the method comprising:
obtaining at least one two-step random access (RA) configuration; and/or
selecting a preamble and/or a msgA PUSCH resource based at least in part on the at least one two-step RA configuration.

Embodiment D2. The method of Embodiment D1, further comprising:
selecting a beam, the selection of the preamble and/or the msgA PUSCH resource based at least in part on a two-step RA configuration associated with the selected beam.

Embodiment D3. The method of any one of Embodiments D1 and D2, wherein:
the selection of the preamble and/or the msgA PUSCH resource based at least in part on a payload size for the msgA PUSCH.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device for selecting resources for a two-step random access (RA) procedure, the method comprising:
    receiving a two-step RA configuration for a cell from a network node, the two-step RA configuration comprising: a first resource allocation for a physical uplink shared channel (PUSCH) transmission of a first message (msgA) of the two-step RA procedure, the first resource allocation for the PUSCH transmission of the msgA being associated with a first set of preambles; and a second resource allocation for the PUSCH transmission of the msgA associated with a second set of preambles;
    selecting at least one beam from among a plurality of beams in the cell;
    determining that the selected beam is associated with the two-step RA configuration; and
    selecting, based on the two-step RA configuration being associated with the selected beam, one of the first and second resource allocation and the associated one of the first and second set of preambles, selecting one of the first and second resource allocation and the associated one of the first and second set of preambles comprising:
        selecting the second resource allocation and associated second set of preambles when a payload size of the PUSCH transmission of the msgA is greater than a size threshold value and an estimated downlink pathloss is less than a pathloss threshold value; and
        selecting the first resource allocation and associated first set of preambles otherwise; and
    transmitting the PUSCH transmission of the msgA using the selected one of the first and second resource allocation.

2. The method according to claim 1, further comprising:
    selecting a preamble for the msgA transmission of the two-step RA procedure from the selected one of the first and second set of preambles; and
    transmitting the selected preamble of the msgA.

3. The method according to claim 1, wherein the first and second resource allocation each comprises at least one of: time resources; frequency resources; modulation and coding scheme; transmit power instruction; and redundancy version.

4. The method according to claim 1, wherein the selection of one of the first and second resource allocation and the associated one of the first and second set of preambles is performed based on the two-step RA configuration and the payload size of the PUSCH transmission of the msgA.

5. The method according to claim 4, wherein the size threshold value is associated with the first and second resource allocations of the two-step RA configuration, and wherein the pathloss threshold value is associated with the second set of preambles.

6. The method according to claim 1, wherein selecting one of the first and second resource allocation and the associated one of the first and second set of preambles further comprises:
    comparing the payload size of the PUSCH transmission of the msgA with the size threshold value; and
    comparing the estimated downlink pathloss with the pathloss threshold value.

7. The method according to claim 6, wherein the size threshold value is associated with the first and second resource allocations of the two-step RA configuration, and wherein the pathloss threshold value is associated with the second set of preambles.

8. The method according to claim 1, wherein the size threshold value is associated with the first and second resource allocations of the two-step RA configuration, and wherein the pathloss threshold value is associated with the second set of preambles.

9. A method implemented in a network node configured to communicate with a wireless device, the method comprising:
    transmitting a two-step random access (RA) configuration for a cell to the wireless device, the two-step RA configuration comprising:
        a first resource allocation for a physical uplink shared channel (PUSCH) transmission of a first message (msgA) of a two-step RA procedure, the first resource allocation for the PUSCH transmission of the msgA being associated with a first set of preambles; and
        a second resource allocation for the PUSCH transmission of the msgA associated with a second set of preambles; and
    receiving the PUSCH transmission of the msgA according to one of the first and second resource allocation, receiving the PUSCH transmission of the msgA comprising:
        when a payload size of the PUSCH transmission of the msgA is greater than a size threshold value and an estimated downlink pathloss is less than a pathloss threshold value; and receiving the PUSCH transmission of the msgA according to the second resource allocation, otherwise, receiving the PUSCH transmission of the msgA according to the first resource allocation; and the PUSCH transmission of the msgA being received according to the two-step RA configuration associated with at least one beam in the cell that is selected by the wireless device from among a plurality of beams in the cell.

10. The method according to claim 9, wherein:

the one of the first and second resource allocation and the associated one of the first and second set of preambles are selected based on the two-step RA configuration and the payload size of the PUSCH transmission of the msgA;

the size threshold value is associated with the first and second resource allocations of the two-step RA configuration; and the pathloss threshold value is associated with the second set of preambles.

11. A wireless device for selecting resources for a two-step random access (RA) procedure, the wireless device comprising processing circuitry, the processing circuitry being configured to:

receive a two-step RA configuration for a cell from a network node, the two-step RA configuration comprising: a first resource allocation for a physical uplink shared channel (PUSCH) transmission of a first message (msgA) of the two-step RA procedure, the first resource allocation for the PUSCH transmission of the msgA being associated with a first set of preambles; and a second resource allocation for the PUSCH transmission of the msgA associated with a second set of preambles;

select at least one beam from among a plurality of beams in the cell;

determine that the selected beam is associated with the two-step RA configuration; and select, based on the two-step RA configuration being associated with the selected beam, one of the first and second resource allocation and the associated one of the first and second set of preambles, the processing circuitry being configured to select one of the first and second resource allocation and the associated one of the first and second set of preambles by at least being configured to cause the wireless device to:

select the second resource allocation and the associated second set of preambles when a payload size of the PUSCH transmission of the msgA is greater than a size threshold value and an estimated downlink pathloss is less than a pathloss threshold value; and select the first resource allocation and associated first set of preambles otherwise; and transmit the PUSCH transmission of the msgA using the selected one of the first and second resource allocation.

12. The wireless device according to claim 11, wherein the processing circuitry is configured to:

select a preamble for the msgA transmission of the two-step RA procedure from the selected one of the first and second set of preambles; and transmit the selected preamble of the msgA.

13. The wireless device according to claim 11, wherein the first and second resource allocation each comprises at least one of: time resources; frequency resources; modulation and coding scheme; transmit power instruction; and redundancy version.

14. The wireless device according to claim 11, wherein the selection of one of the first and second resource allocation and the associated one of the first and second set of preambles is performed based on the two-step RA configuration and the payload size of the PUSCH transmission of the msgA.

15. The wireless device according to claim 14, wherein the size threshold value is associated with the first and second resource allocations of the two-step RA configuration, and wherein the pathloss threshold value is associated with the second set of preambles.

16. The wireless device according to claim 11, wherein the processing circuitry is configured to select one of the first and second resource allocation and the associated one of the first and second set of preambles by at least being configured to cause the wireless device to:

compare the payload size of the PUSCH transmission of the msgA with the size threshold value; and compare the estimated downlink pathloss with the pathloss threshold value.

17. The wireless device according to claim 16, wherein the size threshold value is associated with the first and second resource allocations of the two-step RA configuration, and wherein the pathloss threshold value is associated with the second set of preambles.

18. The wireless device according to claim 11, wherein the size threshold value is associated with the first and second resource allocations of the two-step RA configuration, and wherein the pathloss threshold value is associated with the second set of preambles.

19. A network node configured to communicate with a wireless device, the network node comprising processing circuitry, the processing circuitry configured to:

transmit a two-step random access (RA) configuration for a cell to the wireless device, the two-step RA configuration comprising:

a first resource allocation for a physical uplink shared channel (PUSCH) transmission of a first message (msgA) of a two-step RA procedure, the first resource allocation for the PUSCH transmission of the msgA being associated with a first set of preambles; and a second resource allocation for the PUSCH transmission of the msgA associated with a second set of preambles; and receive the PUSCH transmission of the msgA according to one of the first and second resource allocation, the processing circuitry being configured to cause the network node to receive the PUSCH transmission of the msgA by being configured to cause the network node to:

when a payload size of the PUSCH transmission of the msgA is greater than a size threshold value and an estimated downlink pathloss is less than a pathloss threshold value, receive the PUSCH transmission of the msgA according to the second resource allocation, otherwise, receive the PUSCH transmission of the msgA according to the first resource allocation; and the PUSCH transmission of the msgA being received according to the two-step RA configuration associated with at least one beam in the cell that is selected by the wireless device from among a plurality of beams in the cell.

20. The network node according to claim 19, wherein:

the one of the first and second resource allocation and the associated one of the first and second set of preambles are selected based on the two-step RA configuration and the payload size of the PUSCH transmission of the msgA;

the size threshold value is associated with the first and second resource allocations of the two-step RA configuration; and the pathloss threshold value is associated with the second set of preambles.

* * * * *

UNITED STATES PATENT AND TRADEMARK OFFICE
CERTIFICATE OF CORRECTION

PATENT NO. : 12,127,271 B2
APPLICATION NO. : 17/629950
DATED : October 22, 2024
INVENTOR(S) : Enbuske et al.

It is certified that error appears in the above-identified patent and that said Letters Patent is hereby corrected as shown below:

In the Specification

In Column 1, Line 12, delete "No." and insert -- No.: --, therefor.

In Column 3, Line 28, delete "N≥1," and insert -- N<1, --, therefor.

In Column 3, Line 32, delete "If R" and insert -- If N≥1, R --, therefor.

In Column 15, Lines 17-19, delete
"$P_{PUSCH}(i)=\max(P_{CMAX},[MsgA]preambleReceivedTargetPower+\Delta_{MsgA\_PUSCH}+10\log_{10}(2^{\mu}M_{RB}^{PUSCH}(i))+\alpha PL(i)+\Delta_{rampup}(i))$," and insert
-- $P_{PUSCH}(i)=\max(P_{CMAX},[MsgA]preambleReceivedTargetPower+\Delta_{MsgA\_PUSCH}+10\log_{10}(2^{\mu}M_{RB}^{PUSCH}(i))+\alpha PL(i)+ \Delta_{TF}(i)+\Delta_{rampup}(i))$, --, therefor.

In Column 43, Line 23, delete "$N_{info} \leq N_{TBs}(1)$" and insert -- $N_{info} \leq N_{TBS}(1)$, --, therefor.

In Column 43, Line 51, delete "$N_{TBs}(1)$" and insert -- $N_{TBS}(1)$ --, therefor.

In Column 52, Line 30, delete "$N_{info}$," and insert -- $N_{info}$ --, therefor.

In Column 52, Line 32, delete "$N_{TBs}(1)$" and insert -- $N_{TBS}(1)$ --, therefor.

In Column 55, Line 64, delete "$N_{info} > N_{TBs}(1)$," and insert -- $N_{info} > N_{TBS}(1)$, --, therefor.

In Column 55, Line 66, delete "$N_{info} \leq N_{TBs}$" and insert -- $N_{info} \leq N_{TBS}$ --, therefor.

In Column 56, Line 42, delete "$N_{TBs}(1) < N_{info}$," and insert -- $N_{TBS}(1) < N_{info}$, --, therefor.

In Column 56, Line 45, delete "$N_{info} \leq N_{TBs}(1)$;" and insert -- $N_{info} \leq N_{TBS}(1)$; --, therefor.

Signed and Sealed this
Tenth Day of June, 2025

Coke Morgan Stewart
*Acting Director of the United States Patent and Trademark Office*

In Column 56, Line 52, delete "$N_{TBs}(1) < N_{info} \leq N_{TBS}(2)$" and insert -- $N_{TBS}(1) < N_{info} \leq N_{TBS}(2)$ --, therefor.